United States Patent
Kashihara et al.

(10) Patent No.: US 6,584,270 B2
(45) Date of Patent: Jun. 24, 2003

(54) FIXED COMPONENT AND OPTICAL COMPONENT EMPLOYING THE SAME

(75) Inventors: Kazuhisa Kashihara, Tokyo (JP); Kanji Tanaka, Tokyo (JP); Yoshinobu Nekado, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/765,609

(22) Filed: Jan. 22, 2001

(65) Prior Publication Data

US 2001/0036350 A1 Nov. 1, 2001

(30) Foreign Application Priority Data

Jan. 20, 2000 (JP) ........................................ 2000-011586

(51) Int. Cl.⁷ .............................. G02B 6/36; G02B 6/44
(52) U.S. Cl. ....................................... 385/137; 385/138
(58) Field of Search ................................ 385/128, 138, 385/137, 94, 99, 114

(56) References Cited

U.S. PATENT DOCUMENTS

| | | | |
|---|---|---|---|
| 4,033,668 A | * | 7/1977 | Presby |
| 4,488,773 A | * | 12/1984 | Wagner |
| 5,671,315 A | * | 9/1997 | Tabuchi et al. ............. 385/137 |
| 5,799,118 A | * | 8/1998 | Ogusu et al. ................. 385/14 |
| 6,181,864 B1 | * | 1/2001 | Jang et al. .................. 385/137 |
| 6,195,495 B1 | * | 2/2001 | Ota et al. ................... 385/137 |
| 6,216,939 B1 | * | 4/2001 | Thackara ................... 228/124.6 |
| 6,219,484 B1 | * | 4/2001 | Rhee et al. ................. 385/137 |
| 2001/0033729 A1 | * | 10/2001 | Kuroha ........................ 385/138 |
| 2002/0051617 A1 | * | 5/2002 | Khan et al. ................. 385/137 |

FOREIGN PATENT DOCUMENTS

| | | | |
|---|---|---|---|
| JP | 55-156908 A | * 12/1980 | .................. 385/99 |
| JP | 7-218758 | 8/1995 | |
| JP | 7-230010 | 8/1995 | |

* cited by examiner

*Primary Examiner*—Rodney Bovernick
*Assistant Examiner*—Mike Stahl
(74) *Attorney, Agent, or Firm*—Oblon, Spivak, McClelland, Maier & Neustadt, P.C.

(57) ABSTRACT

The permeation of the moisture into a case made of metal is roughly perfectly suppressed, and the optical communications of high quality are made possible by the operation of component(s) accommodated in the case. A plurality of through holes through which the outside of the case and a component accommodating portion communicate with each other are provided in the metallic case including a body having the component accommodating portion, and a lid. Fixed components in which an optical fiber ribbon and an optical fiber(s) are respectively sandwiched between associated metallic substrates and associated optical fiber fixing plates to be fixed by solder are fitted into the respective through holes to be hermetically sealed and fixed to the metallic case. One end side of the optical fiber ribbon and the optical fiber(s) which are respectively fixed to the fixed components is inserted into the component accommodating portion of the body to be connected to an input terminal and an output terminal of an arrayed waveguide grating type optical multiplexer/demultiplexer, respectively. The other end side of the optical fiber ribbon and the optical fiber(s) is extracted to the outside of the metallic case.

29 Claims, 10 Drawing Sheets

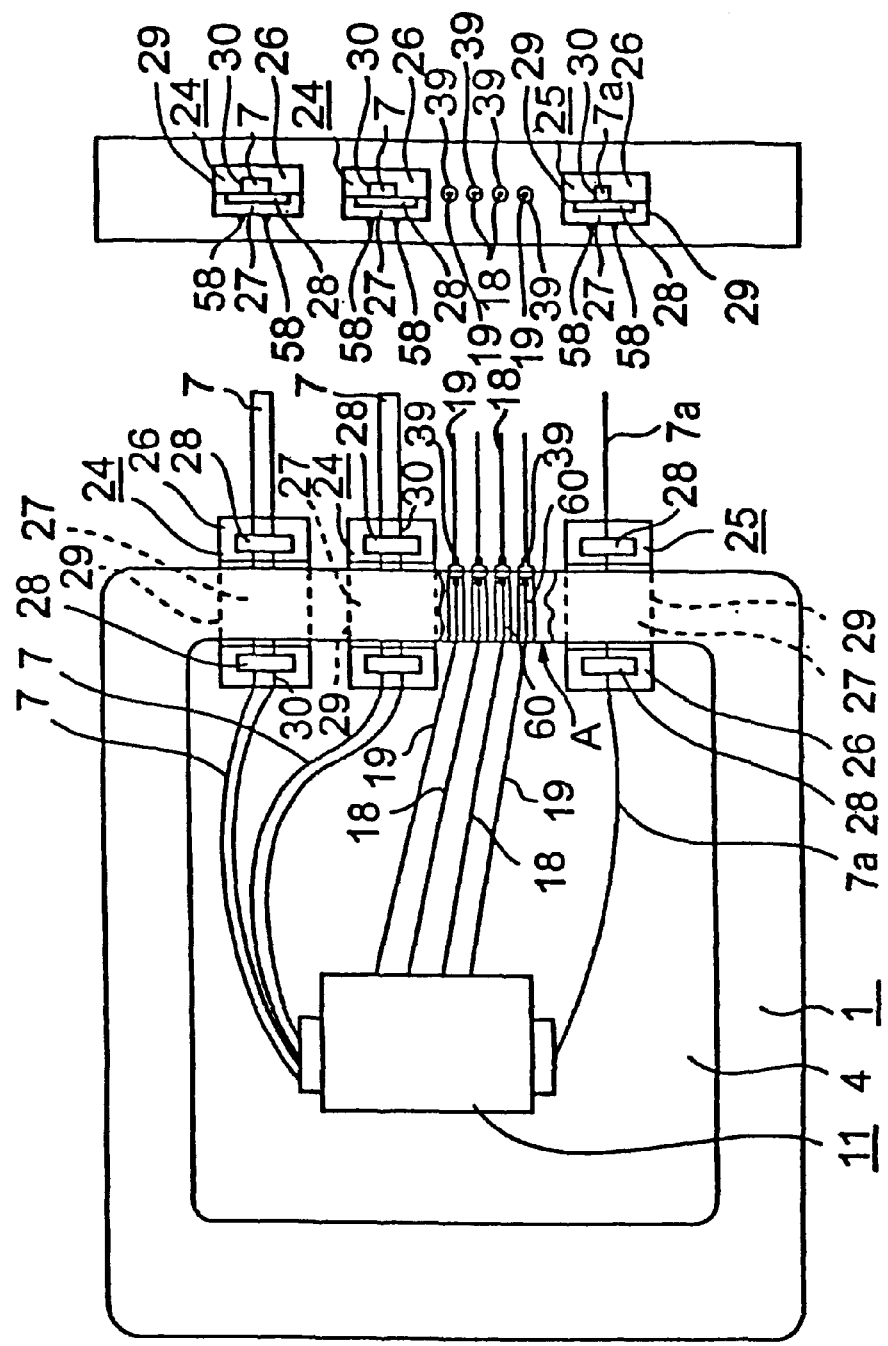

FIG. 3A
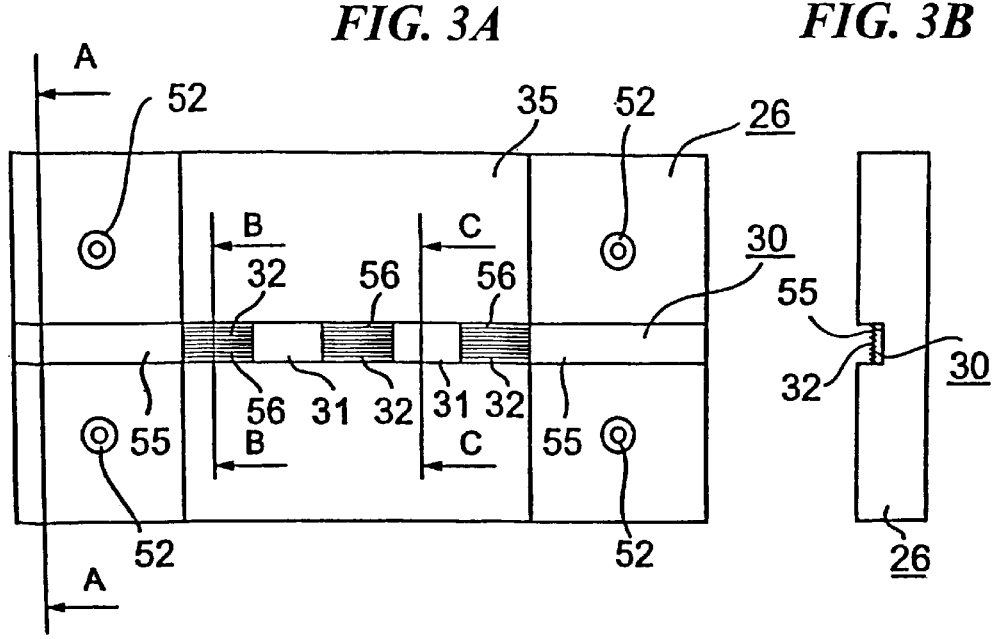
FIG. 3B
FIG. 3C
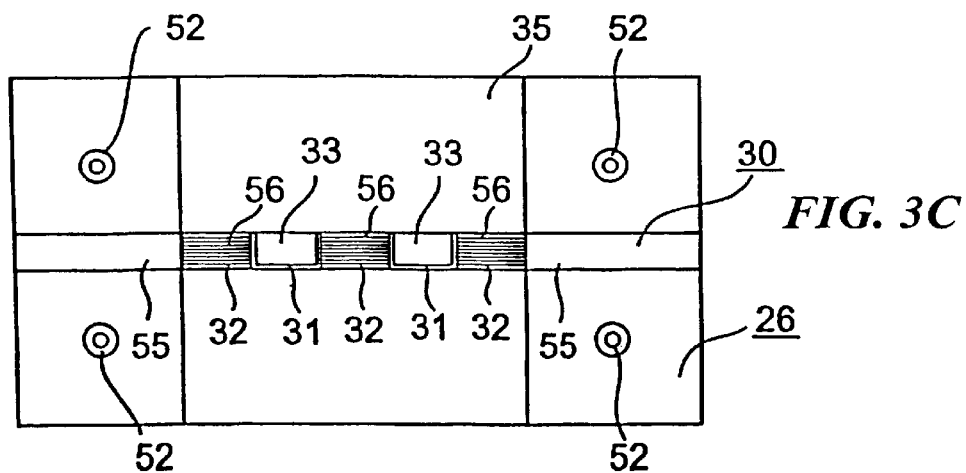
FIG. 3D
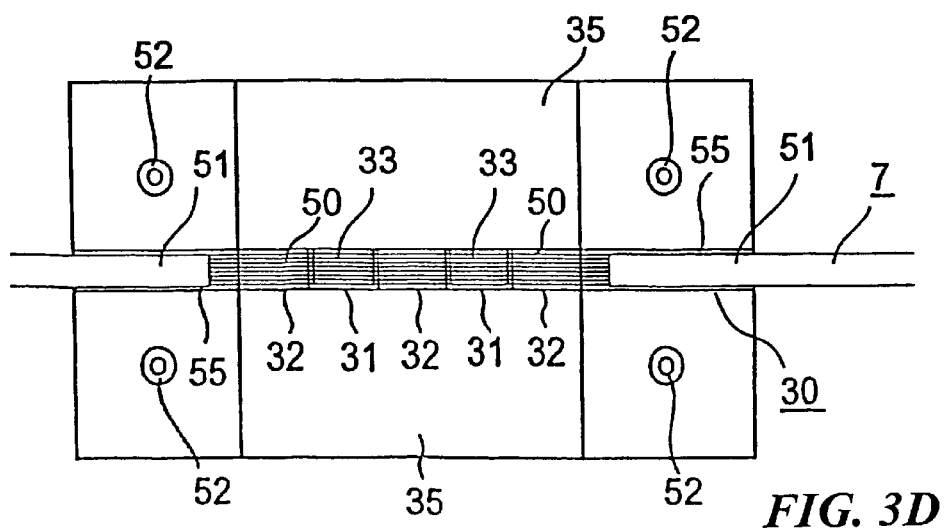

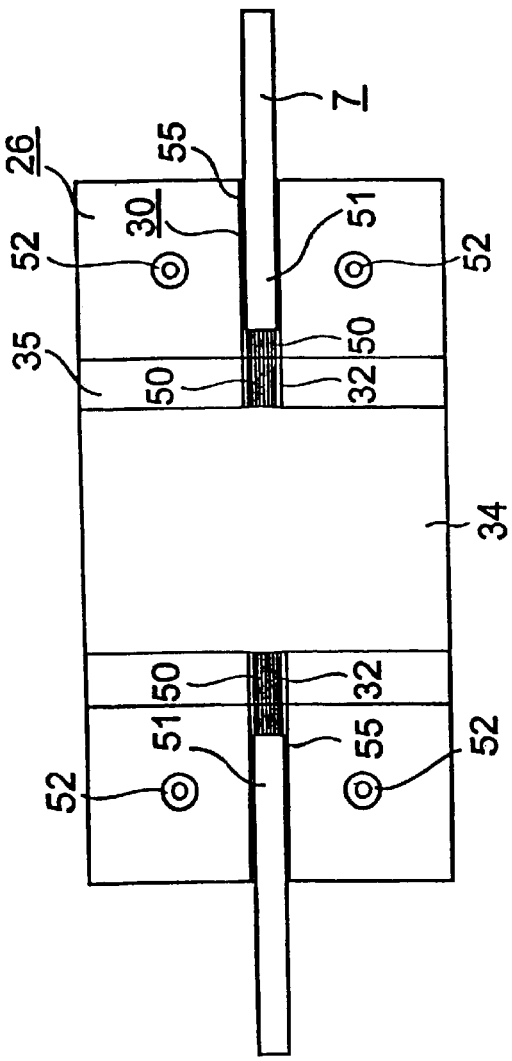
FIG. 4A
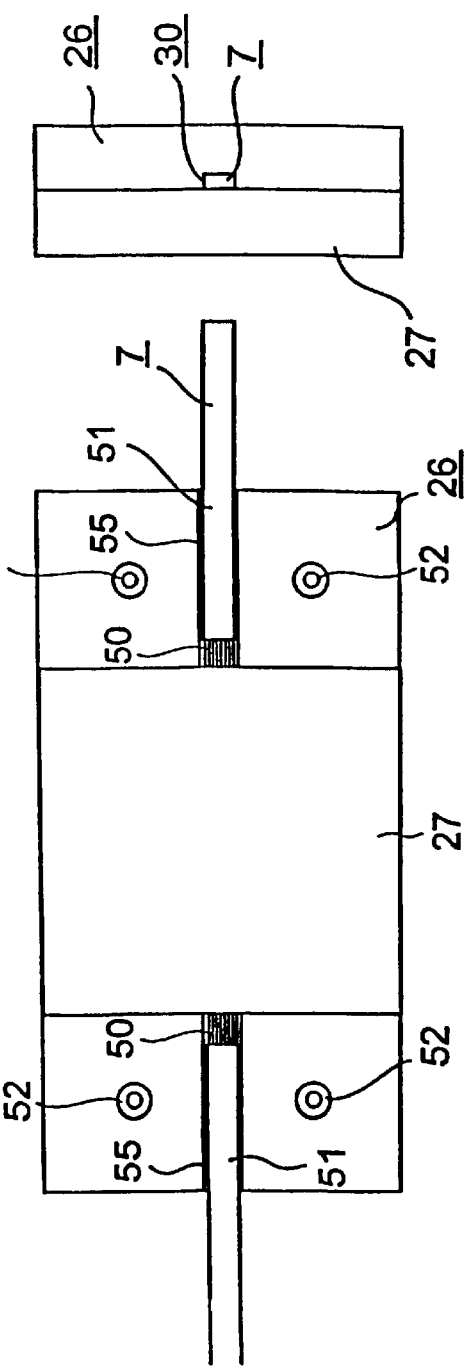
FIG. 4C
FIG. 4B

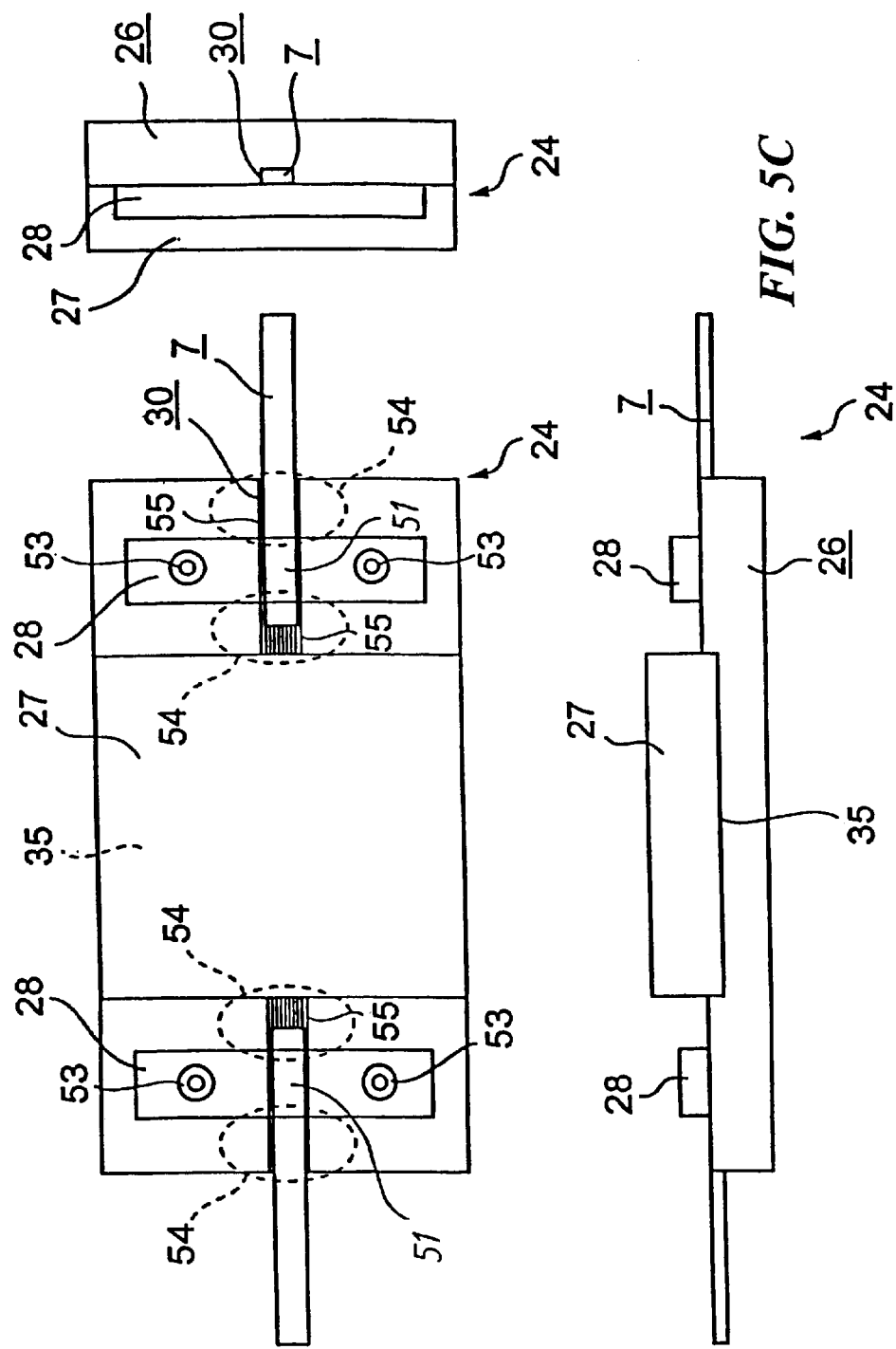

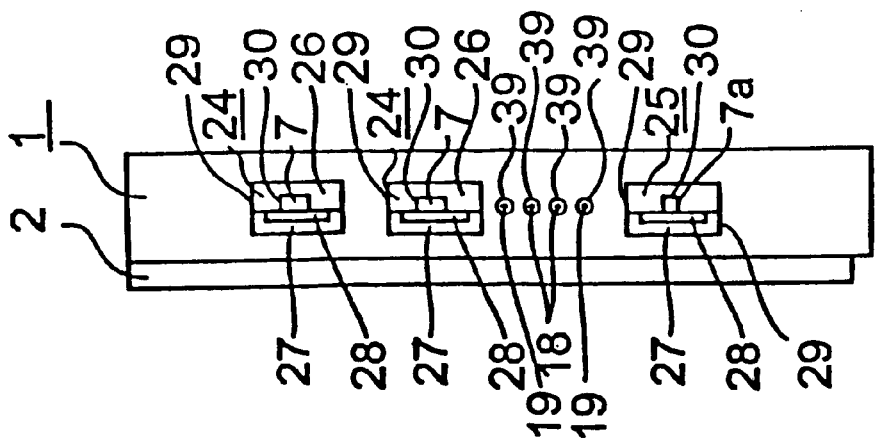
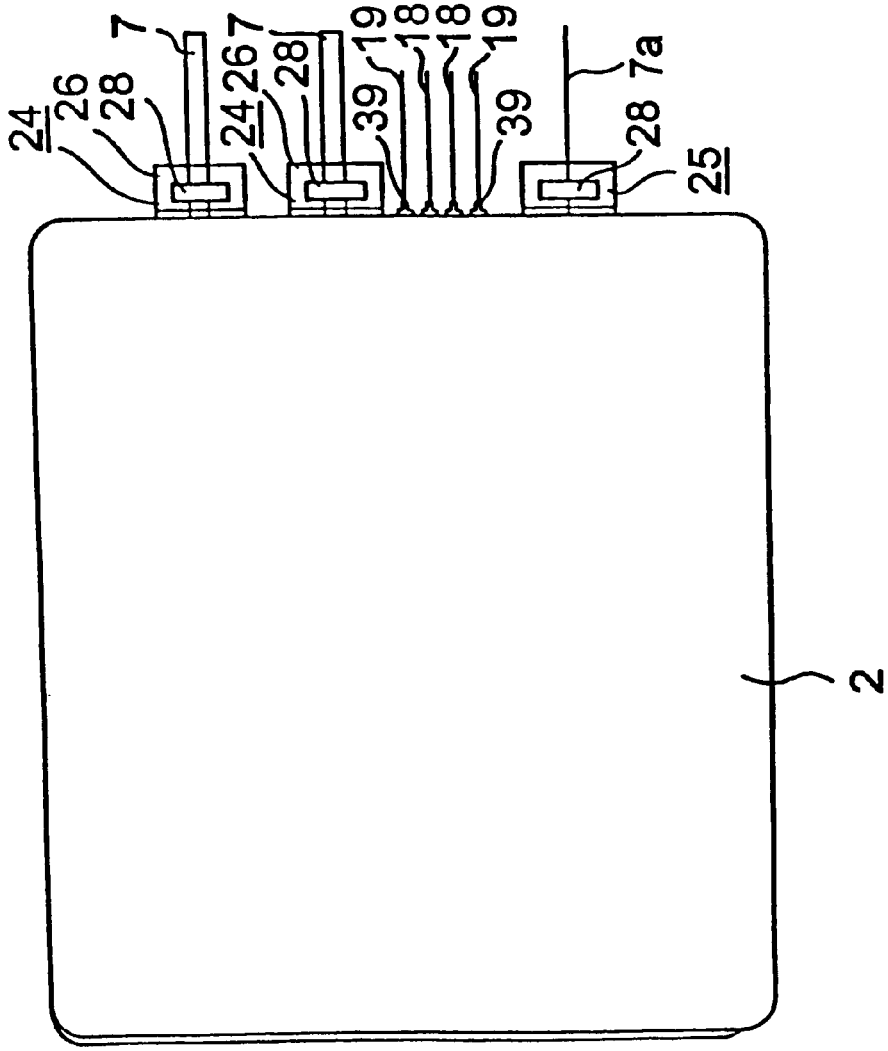

*FIG. 8A*
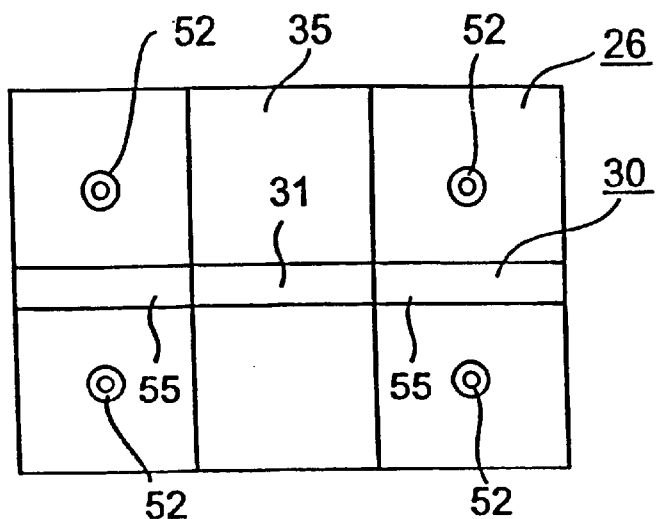
*FIG. 8B*
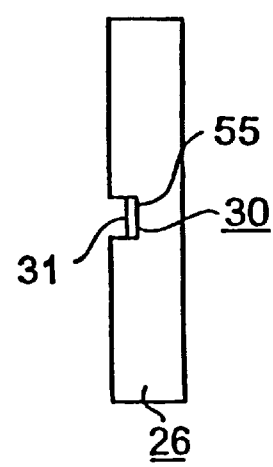
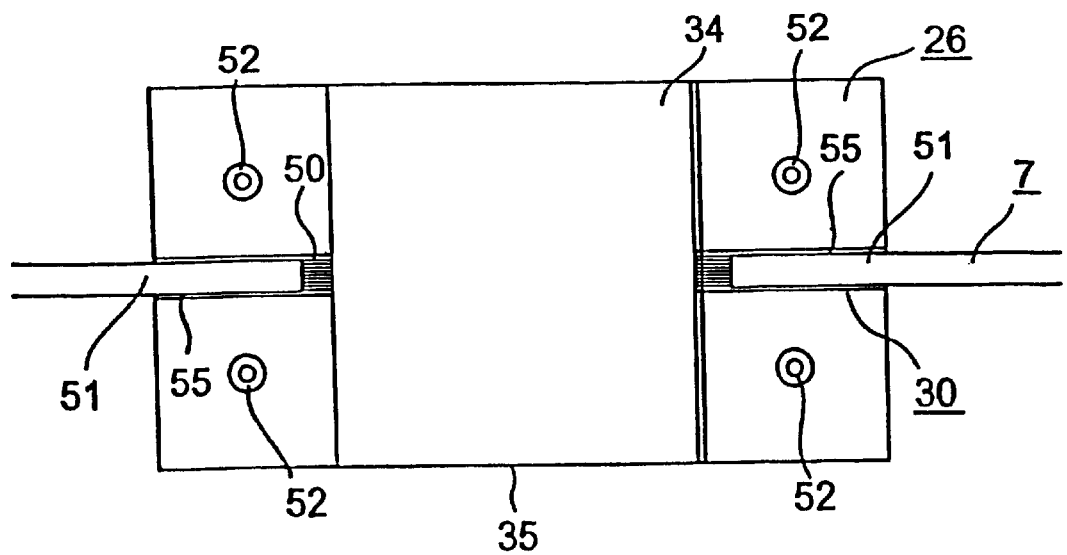
*FIG. 8C*

FIXED COMPONENT AND OPTICAL COMPONENT EMPLOYING THE SAME

BACKGROUND OF THE INVENTION

1. Field of the Invention

The present invention relates to a fixed component which is used in the optical communications or the like and an optical component employing the same.

2. Description of the Related Art

In recent years, in the optical communications, as the technology for making a rapid increase of the transmission capacity, the study and development of the optical wavelength division multiplexing communications have been actively carried out and the practical use thereof is in progress. The optical wavelength division multiplexing communications is such that for example, a plurality of lights having the wavelengths different from one another are wavelength-multiplexed to be transmitted. In such an optical wavelength division multiplexing communications system, there is required the optical multiplexing/demultiplexing device for demultiplexing optically the transmitted wavelength multiplexed light into a plurality of lights having the wavelengths different from one another and for multiplexing optically a plurality of lights having wavelengths different from one another.

As one example of such a optical multiplexing/demultiplexing device, for example, there is an AWG (Arrayed Waveguide Grating) type optical multiplexing/demultiplexing device 11 as shown in FIG. 9. The AWG type optical multiplexing/demultiplexing device 11 is such that a waveguide structure as shown in FIG. 9 is formed on a substrate 41. This waveguide structure is constituted of one or more optical input waveguides 42, a first slab waveguide 43, an arrayed waveguide 44, a second slab waveguide 45, and a plurality of optical output waveguides 46. In this waveguide structure, as shown in FIG. 9, the first slab waveguide 43 is connected to the output end of the above-mentioned one or more optical input waveguides 42 arranged side by side. The arrayed waveguide 44 is connected to the output end of the first slab waveguide 43. In addition, the second slab waveguide 45 is connected to the output end of the arrayed waveguide 44. Furthermore, a plurality of optical output waveguides 46 arranged side by side are connected to the output end of the second slab waveguide 45.

The above-mentioned arrayed waveguide 44 propagates light output from the first slab waveguide 43. As shown in FIG. 9, the arrayed waveguide 44 consists of a plurality of channel waveguides 44a arranged side by side which are formed in lengths different between adjacent channel waveguides. Then, the lengths of the adjacent channel waveguides 44a are different from each other with the differences (ΔL) preset. The diffraction grating is constituted by such an arrayed waveguide 44.

In this connection, the above-mentioned one or more optical input waveguides 42 and optical output waveguides 46, for example, are provided in correspondence to the number of demultiplexed or multiplexed signal lights (i.e., the number of lights having the wavelengths different from one another which are demultiplexed or multiplexed by the AWG type optical multiplexing/demultiplexing device 11) which are required for the AWG type optical multiplexing/demultiplexing device 11. The number of the channel waveguides 44a of the arrayed waveguide 44 are provided by 100 for example. In addition, a large number of optical input waveguides 42, and a large number of optical output waveguides 46 are provided. In FIG. 9, however, for the sake of simplicity of the figure, the number of optical input waveguides 42, the number of channel waveguides 44a of the arrayed waveguide 44, and the number of optical output waveguides 46 are schematically shown.

The above-mentioned AWG type optical multiplexing/demultiplexing device 11 is formed such that an optical waveguide portion 40 made of quartz based glass is laminated on a silicon substrate 41. Then, the above-mentioned optical waveguide portion 40 is formed such that a under cladding which is formed on the silicon substrate 41, a core in which the waveguide structure is formed, and a over cladding with which the core is covered are laminated in turn. In the conventional AWG type optical multiplexing/demultiplexing device 11, the over cladding is made of quartz based glass, for example, in which 5 mol % $B_2O_3$ and 5 mol % $P_2O_5$ are added to pure quartz.

An optical fiber on the transmission side (not shown) for example is connected to one of one or more optical input waveguides 42 such that the wavelength-multiplexed light is introduced thereinto. The light which has been introduced to the first slab waveguide 43 through one of one or more optical input waveguides 42 is diffracted by the diffraction effect and enters the arrayed waveguide 44 to be propagated through the arrayed waveguide 44.

The light which has been propagated through the arrayed waveguide 44 reaches the second slab waveguide 45 and then is condensed in the optical output waveguides 46 to be output therefrom. Now, as described above, the lengths of the adjacent channel waveguides 44a are different between adjacent channel waveguides by the preset differences (ΔL). Thus, the lights which have been output from the channel waveguides 44a to the second slab waveguide 45 are shifted in phase from each other. The phase front of the lights is tilted in correspondence to the differences and then the position where the light is condensed is determined by the angle of this tilt. For this reason, the positions where the lights having the wavelengths different from one another are condensed are different from one another. Then, the optical output waveguides 46 are formed in those condensing positions, whereby the lights having the different wavelengths can be output from the different optical output waveguides 46 for the wavelengths.

In addition, the AWG type optical multiplexing/demultiplexing device 11 utilizes the principle of the reciprocity (the reversibility) of the optical circuit. For this reason, the AWG type optical multiplexing/demultiplexing device 11 has the function as the optical multiplexer as well as the function as the optical demultiplexer. That is, a plurality of lights having the wavelengths different from one another may be input to the respective optical output waveguides 46 for the wavelengths. Then, these lights pass through the reversed propagation path to the above-mentioned propagation path to be multiplexed in the arrayed waveguide 44 to be output from one of one or more optical input waveguides 42.

In such an AWG type optical multiplexing/demultiplexing device 11, as described above, the wavelength resolution is proportional to the differences (ΔL) between the lengths of the adjacent channel waveguides 44a of the arrayed waveguide. For this reason, the above-mentioned differences ΔL is designed so as to be made large, whereby there becomes possible the optical multiplexing/demultiplexing device for the wavelength multiplexed lights having the narrow wavelength intervals which has not been able to be realized in the conventional optical multiplexer/demultiplexer. As a result, there can be obtained the optical multiplexing/demultiplexing function (i.e., the function of demultiplexing or multiplexing a plurality of light signals having the wavelength intervals of equal to or smaller than 1 nm) for a plurality of signal lights which is required to realize the high density-optical wavelength division multiplexing communications.

In this connection, in the AWG type optical multiplexing/demultiplexing device 11 as described above, in general, one sheet of half waveplate 48 is provided so as to cross the longitudinal center portion of the arrayed waveguide 44. As a result, the polarization dependence is eliminated. The polarization dependency of the central wavelength is caused by waveguide birefringence which is the effective refractive index differences between the TE mode and the TM mode which is propagated through the arrayed waveguide. The above-mentioned half waveplate 48 is inserted into a slit 47 which is formed so as to intersect perpendicularly the arrayed waveguide 44 (the channel waveguides 44a) at the longitudinal central part of the arrayed waveguide 44. As a result, the half waveplate 48 is arranged so as to intersect perpendicularly the arrayed waveguide 44 (the channel waveguides 44a)

By the way, if the temperature of the AWG type optical multiplexing/demultiplexing device 11 fluctuates, then the differences in length and the refractive indexes of the waveguides in the optical waveguide portion 40 are correspondingly changed. As a result, there arises a problem in that the wavelengths of the lights to be multiplexed or demultiplexed as described above are shifted.

Then, in order to eliminate this problem, it is carried out that the AWG type optical multiplexing/demultiplexing device 11 is accommodated together with temperature holding means as will be described below in a case (a package) made of metal. The temperature holding means serves to hold the AWG type optical multiplexing/demultiplexing device 11 at a predetermined setting temperature. As for the temperature holding means, a small Peltier module which enables the temperature adjustment both on the low temperature side and the high temperature side is mainly employed. If such a construction is adopted, then the environment temperature in the circumference is in general in the range of −20° C. to 70° C., whereas the temperature of the AWG type optical multiplexing/demultiplexing device 11 can be adjusted at the roughly fixed temperature before and after 45° C. for example to be used. As a result, the wavelength shift resulting from the above-mentioned temperature fluctuation amount can be prevented.

FIG. 10A is a top plan view showing one example of the main structure of an optical component which is constructed such that the AWG type optical multiplexing/demultiplexing device 11 is accommodated together with the Peltier module in the package. In addition, FIG. 10B is a cross sectional view of the optical component shown in FIG. 10A. In the optical component shown in FIG. 10A and FIG. 10B, a package as a case made of metal is constructed of a body 1 made of metal and a lid 2 made of metal. A Peltier module 6, a heat spreader 12 and the AWG type optical multiplexing/demultiplexing device 11 are laminated in this order from the bottom portion to be accommodated in a component accommodating portion 4 of the body 1.

Optical fiber ribbon 7 are respectively fixed to the connection end faces on both the sides of the AWG type optical multiplexing/demultiplexing device 11. In this connection, the optical fiber ribbon 7 is formed such that the outer peripheries of a plurality of optical fibers arranged in parallel with one another are coated with a lid.

The optical fiber ribbon 7 which is arranged on one end side of the AWG type optical multiplexing/demultiplexing device 11 is connected to one of one or more optical input waveguides 42 of the AWG type optical multiplexing/demultiplexing device 11. In addition, the optical fiber ribbon 7 which is arranged on the other end side of the AWG type optical multiplexing/demultiplexing device 11 is connected to the optical output waveguides 46 of the AWG type optical multiplexing/demultiplexing device 11. Glass lids 13 are respectively provided on the connection end face sides of the AWG type optical multiplexing/demultiplexing device 11. In addition, glass plates 14 are arranged on the upper and lower sides in the connection end face sides of the optical fiber ribbon 7, respectively.

Recess portions 10 for injection of the potting agent are respectively provided on both the sides of the body 1. Each of the optical fiber ribbon 7 is penetrated through the associated one of the recess portions 10 for injection of the potting agent to be extracted from the package constituted of the body 1 and the lid 2 to the outside thereof. The potting agent 9 such as silicone resin is injected into the recess portions 10 for injection of the potting agent. The optical fiber ribbon 7 is fixed to the body 1 of the casing by the potting agent. In this connection, in FIG. 10A and FIG. 10B, reference numeral 16 designates a boot for fixing the associated one of the optical fiber ribbon 7, and reference numeral 37 designates an optical fiber through hole which is provided in the associated one of the boots 16.

The heat spreader 12 plays a part of equalizing the temperature of the AWG type optical multiplexing/demultiplexing device 11. A thermistor insertion hole 22 is bored through the central part of the heat spreader 12 and a thermistor 23 is inserted into the thermistor insertion hole 22. The heat spreader 12 is tightly fixed to a waveguide chip 11 by the adhesive. In addition, the heat spreader 12 is fixed to the body 1 by the screw(s) 15. The Peltier module 6 is fixed to the heat spreader 12 by the adhesive.

In addition, a recess portion 20 for injection of the potting agent is provided in the body 1. Conductors 18 and 19 are both inserted into the recess portion 20 for injection of the potting agent. The potting agent 9 such as silicone resin is injected into the recess portion 20 for injection of the potting agent in order to fix thereto the conductors 18 and 19. In this connection, the electric power is supplied to the Peltier module 6 through the conductor 19. Also, the signal relating to the detected temperature of the thermistor 23 is introduced to the control portion of the Peltier module 6 through the conductor 18. In addition, the Peltier module 6 carries out the control of the temperature of the AWG type optical multiplexing/demultiplexing device 11 on the basis of the detected temperature provided by the thermistor 23.

In the construction of the optical component shown in FIG. 10A and FIG. 10B, the lid 2 is arranged through an O ring 5 on the upper side of the body 1. In addition, as described above, the potting agent 9 is injected into each of the recess portions 10 and 20 for injection of the potting agent to be filled therein. As a result, the component accommodating portion 4 (the inside of the package) for accommodating therein the AWG type optical multiplexing/demultiplexing device 11 becomes a hermetic sealed space so that the moisture is prevented from being permeated thereinto. In this connection, reference numeral 8 shown in FIG. 10A and FIG. 10B designates a stepped portion.

OBJECTS AND SUMMARY OF THE INVENTION

In the optical component having the construction shown in FIG. 10A and FIG. 10B, however, since the potting agent 9, for example, is formed of silicone resin or the like, it has the water-permeability more or less. For this reason, the moisture is more or less permeated into the package due to the permeation of the potting agent 9. As a result, it is difficult to prevent roughly perfectly the moisture from being permeated into the package.

Therefore, constructing the optical component including an AWG type optical multiplexing/demultiplexing device for example by the proposal will hereinbelow be described. If the construction shown in FIG. 10A and FIG. 10B is adopted, then it is conceivable that the preventation of permeation of the moisture into the package is insufficient. Then, the present inventors considered that the construction with which the moisture was more perfectly prevented from being permeated into the package needs to be proposed.

The above-mentioned AWG type optical multiplexing/demultiplexing device is proposed in Japanese Patent Application No. Hei 11-151922 and Japanese Patent Application No. Hei 11-313502 and Japanese Patent Application No. 2000-000380. More particularly, in the AWG type optical multiplexing/demultiplexing device thus proposed, both of the half waveplate 48 and the slit 47 shown in FIG. 9 are omitted. In addition, the concentration of such dopants as $B_2O_3$ and $P_2O_5$ with the over cladding is larger than the dopant concentration in the conventional AWG type optical multiplexing/demultiplexing device 11. This makes it possible that the value of the waveguide birefringence B which occurs in the optical waveguide portion 40 (including the over cladding, the core and the under cladding) is set so as to fulfill the relationship of $|B| \leq 5.34 \times 10^{-5}$.

As described above, if the dope amounts of $B_2O_3$ and $P_2O_5$ with which the over cladding is doped are increased, then the shift amount of central wavelength of the passing spectrum for each of the polarization of the TE mode and the TM mode in the AWG type optical multiplexing/demultiplexing device 11 (i.e., the differences between the central wavelength $\lambda_{TM}$ of the passing spectrum in the TM mode and the central wavelength $\lambda_{TE}$ of the passing spectrum in the TE mode) can be reduced to near zero. For this reason, in the AWG type optical multiplexing/demultiplexing device 11 based on this proposal, even if the half waveplate 48 is not provided, the effective refractive index of the TE mode of the light propagated through the arrayed waveguide 44 can be made roughly identical to that of the TM mode thereof so that the polarization dependency of the central wavelength can be made come near zero.

As a result, there can be avoided the various problems due to the provision of the half waveplate 48 in the AWG type optical multiplexing/demultiplexing device 11, i.e., the problem of occurrence of the return loss due to the fact that a part of the light made incident to the half waveplate 48 is returned back to the incidence side of one or more optical input waveguides 42, the problem of the cost-up due to the processing of the slit 47 and the provision of the half waveplate 48 therein, and so forth. For this reason, the AWG type optical multiplexing/demultiplexing device 11 based on this proposal is very suitable for the construction of the wavelength division multiplexing communication systems of high quality.

However, the AWG type optical multiplexing/demultiplexing device 11 thus proposed is easy to be influenced by the moisture. As the result of the experimentations made by the present inventors, it becomes clear that when the AWG type optical multiplexing/demultiplexing device 11 thus proposed is arranged for a long period of time under the environment of the high temperature and high humidity, as expressed by a dotted line C of FIG. 9, cracks are then generated in the end portion area of the AWG type optical multiplexing/demultiplexing device 11. Then, the present inventors considered that in order to construct the highly reliable wavelength division multiplexing communication systems using the AWG type optical multiplexing/demultiplexing device 11 thus proposed, the moisture needs to be roughly perfectly prevented from being permeated into the package in which the AWG type optical multiplexing/demultiplexing device 11 is accommodated.

The present invention has been made on the basis of the above-mentioned examinations, and it is therefore an object of the present invention to provide, for example, in an optical component which is constructed such that the optical fiber ribbon connected to the AWG type optical multiplexing/demultiplexing device or the like are extracted from a component accommodating portion of a metallic case made of metal, a fixed component and an optical component employing the same in which the moisture can be almost perfectly prevented from being permeated into the above-mentioned component accommodating portion.

In order to attain the above-mentioned object, according to the present invention, the following construction is made the means for solving the above-mentioned problems associated with the prior art. That is, a first construction of a fixed component of the present invention may provide that at least one of an insertion portion of an optical fiber(s) and an insertion portion of an optical fiber ribbon is formed on the surface side of a metallic substrate; at least a coating removed portion in the middle portion of the optical fiber(s) or the optical fiber ribbon is inserted thereinto along the longitudinal direction of the insertion portions; the peripheral surface of the bared optical fibers of the coating removed portion is coated with metal to form a metal coated optical fibers; the peripheral side of the metal coated optical fibers has solder provided therein; and the metal coated optical fibers are tightly fixed to the above-mentioned metallic substrate by the solder.

In addition, a second construction of a fixed component of the present invention may, in addition to the first construction, provide that an optical fiber fixing member made of metal is provided on the surface side of the above-mentioned metal coated optical fibers such that the metal coated optical fibers are sandwiched between the optical fiber fixing member and the metallic substrate; and the metal coated optical fibers are tightly fixed to the optical fiber fixing member by solder provided on the peripheral side of the metal coated optical fibers.

According to the first and second constructions of the fixed component of the present invention, if the fixed component having these constructions inherent therein are fitted into through portions which are formed in the case made of metal including the component accommodating portion, then one end side of the optical fiber(s) or the optical fiber ribbon which is/are fixed to the associated one(s) of the fixed components can be inserted into the component accommodating portion, and also the other end side of the optical fiber(s) or the optical fiber ribbon can be extracted to the outside of the metallic case. In addition, for example, by providing solder in the joining portion between the inner side of the through hole or through recess portion and the outer periphery side of the fixed component, the fixed component can be hermetically sealed and fixed to the metallic case.

As a result, the permeation of the moisture into the metallic case can be almost perfectly prevented. In addition thereto, it is possible to construct easily the optical component in which the component accommodated in the component accommodating portion can be optically connected to the optical component on the other party for the connection through the optical fiber(s) or the optical ribbon which is/are extracted to the outside of the metallic case.

Furthermore, a first construction of an optical component of the present invention may provide that a through portion through which the outside of a case made of metal and a component accommodating portion communicate with each other is provided in the metallic case including the component accommodating portion; a fixed component having the first or second construction of the fixed component of the above-mentioned invention is fitted into the through portion; one end side of the optical fiber(s) or the optical fiber ribbon which is/are fixed to the fixed component is inserted into the component accommodating portion; the other end side of the optical fiber(s) or the optical fiber ribbon is extracted to the outside of the metallic case; and the fixed component is hermetically sealed and fixed to the metallic case.

In addition, a second construction of an optical component of the present invention may, in addition to the first construction of the optical component, provide that an AWG (Arrayed Waveguide Grating) type optical multiplexing/demultiplexing device having the waveguide construction wherein a first slab waveguide is connected to the output end of one or more optical input waveguides arranged side by side; an arrayed waveguide including a plurality of channel waveguides arranged side by side, which have the lengths different between adjacent channel waveguides by a preset differences and which serve to propagate therethrough the light guided from the first slab waveguide, is connected to the output end of the first slab waveguide; a second slab waveguide is connected to the output end of the arrayed waveguide; and a plurality of optical output waveguides arranged side by side are connected to the output end of the second slab waveguide, is accommodated in a component accommodating portion; a plurality of through portions are formed in a case made of metal; fixed components are fitted and fixed to the through portions, respectively; and one end side of an optical fiber(s) or an optical fiber ribbon which is/are fixed to the respective fixed components is connected to one of above-mentioned one or more optical input waveguides and the above-mentioned optical output waveguides of the AWG type optical multiplexing/demultiplexing device.

In addition, a third construction of an optical component of the present invention may, in addition to the first construction of the optical component, provide that an AWG (Arrayed Waveguide Grating) type optical multiplexing/demultiplexing device in which the waveguide construction wherein a first slab waveguide is connected to the output end of one or more optical input waveguides arranged side by side; an arrayed waveguide including a plurality of channel waveguides arranged side by side, which have the lengths different between adjacent channel waveguides by a preset differences and which serve to propagate therethrough the light guided from the first slab waveguide, is connected to the output end of the first slab waveguide; a second slab waveguide is connected to the output end of the arrayed waveguide; and a plurality of optical output waveguides arranged side by side are connected to the output end of the second slab waveguide, is formed by a core made of quartz based glass; which has a waveguide formation portion including the core, and a over cladding and a under cladding each made of quartz based glass and in which the birefringence generated in the waveguide formation portion is set so as to fulfill the relationship of $|B| \leq 5.34 \times 10^{-5}$ is accommodated in a component accommodating portion; a plurality of through portions are formed in a case made of metal; fixed components are fitted and fixed to the respective through portions; and one end side of an optical fiber(s) or an optical fiber ribbon which is/are fixed to the respective fixed components is connected to one of at least one of the optical input waveguide and the optical output waveguides of the above-mentioned AWG type optical multiplexing/demultiplexing device.

According to the first to third constructions of the optical component of the present invention, the component which is accommodated in the component accommodating portion is optically connected to the optical component on the other party for the connection, whereby the function can be realized. In addition, the influence of the moisture in the outside of the case made of metal is prevented from being exerted on the component which is accommodated in the component accommodating portion. From the foregoing, the function essential to the component can be realized without being influenced by the moisture.

According to the second or third construction of the optical component of the present invention, that is, in the construction in which the AWG type optical multiplexer/demultiplexer is accommodated in the component accommodating portion, the function of the AWG type optical multiplexer/demultiplexer can be realized without being influenced by the moisture. Therefore, it is possible to construct the optical component of the AWG type optical multiplexer/demultiplexer which is suitable for constructing the low cost wavelength division multiplexing optical communication systems without the bad influence by the moisture.

According to the third construction of the optical component of the present invention, that is, in the construction in which the AWG type optical multiplexer/demultiplexer is accommodated in the component accommodating portion; and the waveguide construction of the AWG type optical multiplexer/demultiplexer is formed by a core made of quartz based glass, which has the waveguide formation portion including the core, and the over cladding and the under cladding each made of quartz based glass, and in which the waveguide birefringence B generated in the waveguide formation portion is set so as to fulfill the relationship of $|B| \leq 5.34 \times 10^{-5}$, the optical component is constructed by using the fixed component of the present invention, whereby the bad influence due to the high temperature and the high humidity is avoided so that the feature of the AWG type optical multiplexing/demultiplexing device accommodated in the component accommodating portion can surely be exhibited. For this reason, it is possible to construct the excellent optical component of the AWG type optical multiplexing/demultiplexing device in which the polarization dependency of the central wavelength can be reduced without providing the half waveplate therein.

BRIEF DESCRIPTION OF THE DRAWINGS

These and other objects and advantages of the present invention will become more apparent and more readily appreciated from the following detailed description of the exemplary embodiments of the invention taken in conjunction with the accompanying drawings, in which:

FIG. 1A is a top plan view showing the construction of a main part of an embodiment of an optical component employing a fixed component according to the present invention, and FIG. 1B is a side elevational view of the optical component shown in FIG. 1A;

FIG. 3A is a top plan view schematically showing a metallic substrate constituting the fixed component of the embodiment, FIG. 3B is a schematic side elevational view viewing the metallic substrate shown in FIG. 3A from the side, FIG. 3C is a view useful in explaining an example of a first process of constructing the fixed component of the embodiment, and FIG. 3D is a view useful in explaining an example of a second process of constructing the fixed component of the embodiment;

FIG. 4A is a view useful in explaining an example of a third process of constructing the fixed component of the embodiment, FIG. 4B is a view useful in explaining an example of a fourth process of constructing the fixed component of the embodiment, and FIG. 4C is a schematic side elevational view showing the construction of the fixed component in the middle of the manufacture shown in FIG. 4B;

FIG. 5A is a top plan view showing schematically the fixed component employed in the embodiment, FIG. 5B is a side elevational view of the fixed component shown in FIG. 5A, and FIG. 5C is a front view of the fixed component shown in FIG. 5A;

FIG. 7A is a top plan view of the optical component of the embodiment, and FIG. 7B is a side elevational view of the optical component shown in FIG. 7A;

FIG. 8A is a top plan view showing an example of the metallic substrate which is applied to another embodiment of the fixed component according to the present invention, FIG. 8B is a side elevational view of the metallic substrate shown in FIG. 8A, and FIG. 8C is a view useful in explaining an example of other arrangement of solder chips to the metallic substrate;

DETAILED DESCRIPTION

Figure 2A:
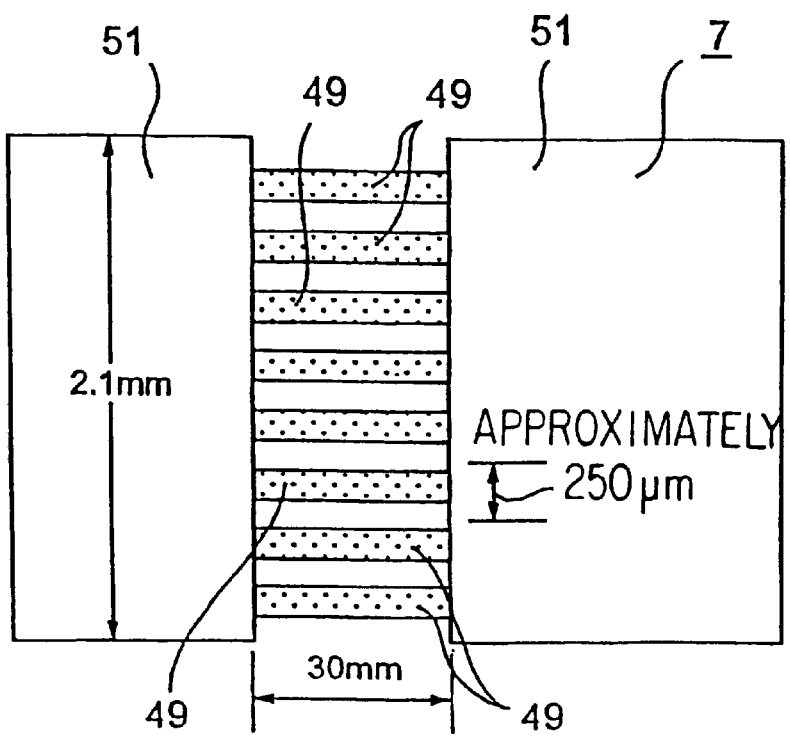
FIG. 2A is a top plan view schematically showing an example in which a part of the covering of an optical fiber ribbon employed in the embodiment is removed.

The embodiments of the present invention will hereinafter be described in detail with reference to the accompanying drawings. In this connection, in the description of the embodiments, the same parts as those in the prior art example are designated with the same reference numerals, and the repeated description thereof is omitted here for the sake of simplicity.

In FIG. 1A, the construction of a main part of one embodiment of an optical component employing a fixed component according to the present invention is shown in the form of a top plan view with a lid omitted. In addition, in FIG. 1B, there is shown a side elevational view when the optical component shown in FIG. 1A is viewed from the right-hand direction.

As shown in FIG. 1A and FIG. 1B, the optical component of this embodiment includes a case made of metal having the body 1 made of metal, and the lid 2 (refer to FIG. 7A) made of metal which is not shown in FIG. 1A and FIG. 1B. The component accommodating portion 4 is formed in the metallic case. The AWG (Arrayed Waveguide Grating) type optical multiplexing/demultiplexing device 11 proposed above (an AWG type optical multiplexing/demultiplexing device which is capable of suppressing the polarization dependency of the central wavelength though the half waveplate 48 is not provided) is accommodated in the component accommodating portion 4.

Figure 10A:
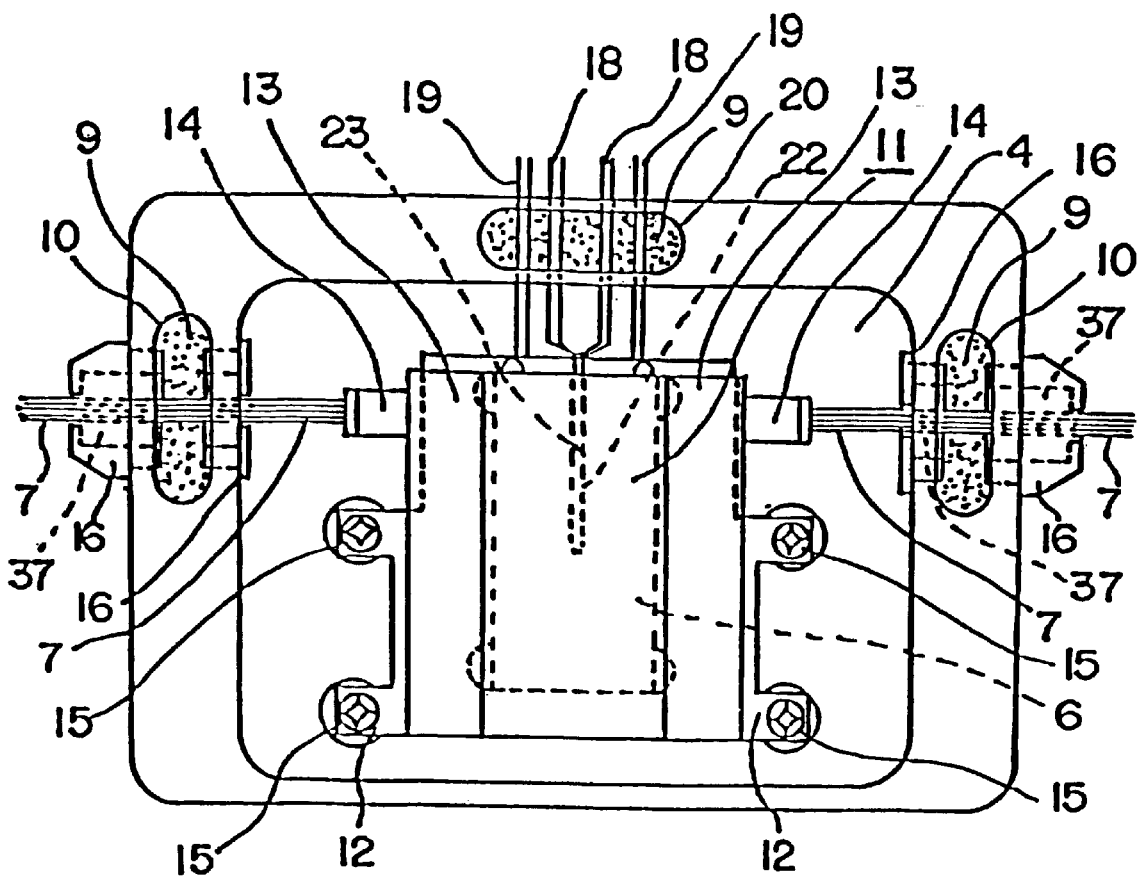
FIG. 10A is a transverse cross sectional view showing an example of a conventional optical component in which the arrayed waveguide grating type optical multiplexer/demultiplexer is accommodated in a case.
Figure 10B:
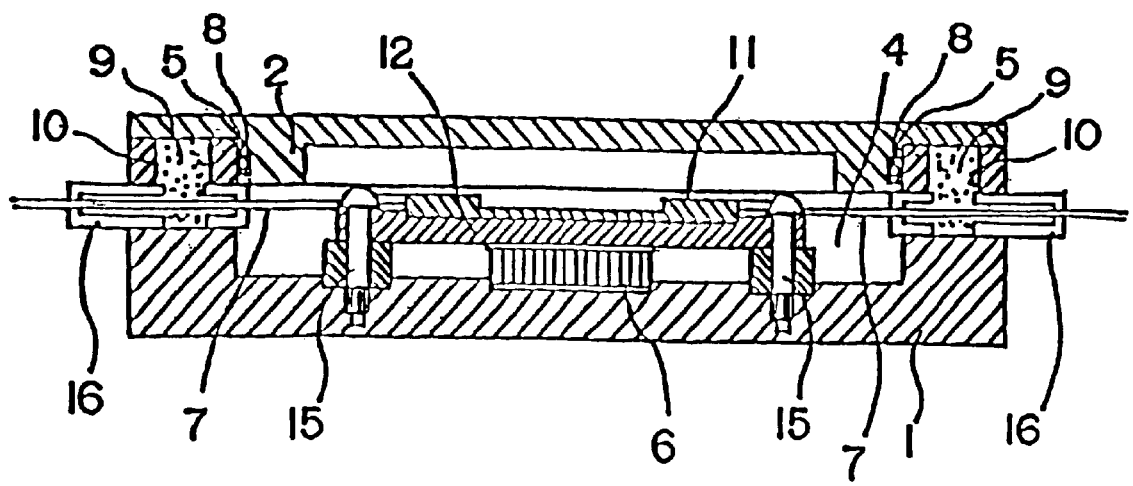
FIG. 10B is a vertical longitudinal cross sectional view of the optical component.

In this connection, while not particularly illustrated in FIG. 1A and FIG. 1B, in this embodiment as well, similarly to the optical component shown in FIG. 10A and FIG. 10B, the Peltier module 6, the heat spreader 12, the thermistor 23 and the like are accommodated together with the AWG type optical multiplexer/demultiplexer 11 in the component accommodating portion 4. This results in the construction in which the temperature of the AWG type optical multiplexer/demultiplexer 11 can be held constant.

In addition, in FIG. 1A, a portion indicated by an arrow A (a part which is sandwiched between wave lines in the figure) is shown in the form of a partial cross sectional view. As shown in the partial cross sectional view, the conductors 19 and 18 which are connected to the Peltier module 6 and the thermistor 23 are inserted through conductor insertion through holes 60 of the body 1, respectively. In this connection, these conductors 18 and 19 are hermetically sealed and fixed, and the hermetic seal construction will be described later.

The features of the optical component of this embodiment are that a plurality of through holes 29 as the through portions through which the outside of the metallic case and the component accommodating portion communicate with each other are provided, fixed components 24 and 25 in which the optical fiber ribbon 7 and the optical fiber 7a are respectively fixed are fitted into the respective through holes 29, and these fixed components 24 and 25 are hermetically fixed to the metallic case.

One end side of the optical fiber ribbon 7 and the optical fiber 7a which are fixed to the fixed components 24 and 25, respectively, is inserted into the component accommodating portion 4 of the body 1. The other end side of the optical fiber ribbon 7 and the optical fiber 7a is extracted to the outside of the metallic case.

Each of the fixed components 24 and 25 has the characteristic construction which is proposed by the present inventors. The construction of each of the fixed components 24 and 25 and a method of manufacturing the same will hereinbelow be described. In this connection, since the construction of the fixed component 24 is almost same to that of the fixed component 25, the construction of the fixed component 24 and a method of manufacturing the same will now be mainly described, and with respect to the construction of the fixed component 25 and a method of manufacturing the same, only a point of differences between the fixed component 24 and the fixed component 25 will now be described.

The fixed component 24 has a metallic substrate 26 having the structure shown in FIG. 3A and FIG. 3B. In this connection, FIG. 3A shows a top plan view of the metallic substrate 26, and FIG. 3B shows a side elevational view of the metallic substrate 26.

In this embodiment, each of the optical fiber ribbon 7 is fixed to the metallic substrate 26 of the associated one of the fixed components 24. In this embodiment, each of the optical fiber ribbon 7 is formed such that the outer periphery side of the eight optical fibers (not shown) arranged in parallel with one another is coated with a suitable lid.

On the other hand, the fixed component 25 has the metallic substrate 26 having the structure which is almost the same as that of the metallic substrate 26 of the fixed component 24, and the optical fiber 7a is fixed to the metallic substrate 26. The optical fiber 7a is formed such that the outer periphery side of one optical fiber is coated with a suitable lid.

The method of manufacturing the fixed component 24 will hereinbelow be described. First of all, the metallic substrate 26 having the structure shown in FIG. 3A and FIG. 3B, and each of the optical fiber ribbon 7 are both prepared. Then, as shown in FIG. 2A, a coating 51 of the middle portion of the optical fiber ribbon 7 is removed to expose the optical fibers which have been bared to obtain bared optical fibers 49. As for the technique of removing the coating 51 of the optical fiber ribbon 7, there are various kinds of techniques such as the technique of employing sulfuric acid, and the technique of utilizing the hot stripper for example. In this case, any one of a plurality of techniques may be adopted.

In this connection, in FIG. 2A, in order that the state of the bared optical fibers 49 which are exposed in the middle portion of the optical fiber ribbon 7 may be readily understood, the optical fiber ribbon 7 is illustrated with the size of the arrangement direction of the optical fibers enlarged. However, in actual, the optical fiber ribbon 7 is transversely longer than that shown in FIG. 2A. For example, as shown in FIG. 2A, the length of the arrangement direction of the optical fibers of the optical fiber ribbon 7 is 2.1 mm for example. Also, the arrangement pitch of the bared optical fibers 49 is about 250 μm for example. In addition, the length of each of the bared optical fibers 49 is 30 mm for example.

Figure 2B:
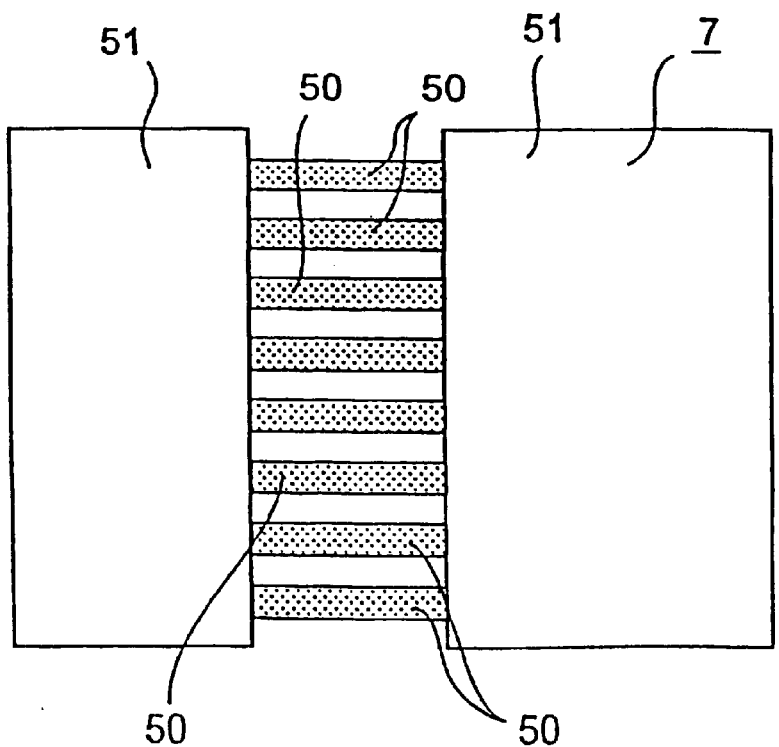
FIG. 2B is a top plan view schematically showing an example in which the bared optical fibers of the coating removed portion of the optical fiber ribbon shown in FIG. 2A are coated with metal.

Next, after having formed the bared optical fibers 49 as described above, as shown in FIG. 2B, the peripheral surface of each of the bared optical fibers 49 is coated with metal. Thus, metal coated optical fibers 50 are formed. The metal coating is carried out by utilizing a suitable method such as the evaporation, the sputtering or the metal plating. In this embodiment, Ti, Ni and Au (Ti/Ni/Au) as the coating metal materials are evaporated in this order onto the periphery of each of the bared optical fibers 49 so as to obtain the metal coating with 0.5 μm thickness. In this connection, the evaporation may also be carried out in the order of Ti/Pt/Au or Cr/Ti/Au. Then, Ti is employed in order to improve the adhesion between glass of the bared optical fibers 49 and metal.

On the other hand, as shown in FIG. 3A, a recess portion 35 extending from the upper end side to the lower end side of FIG. 3A is formed in the central part of the metallic substrate 26. In addition, an insertion recess portion (an insertion trench portion) 30 as the insertion portion for the optical fiber ribbon 7 is formed in the metallic substrate 26. The insertion recess portion 30 is formed from one end side to the other end side in the transverse direction, shown in FIG. 3A, of the metallic substrate 26. In this embodiment, the insertion recess portion 30 and the recess portion 35 intersect vertically each other. In this connection, in FIG. 3A, reference numeral 52 designates a tapped hole.

Figure 6D:
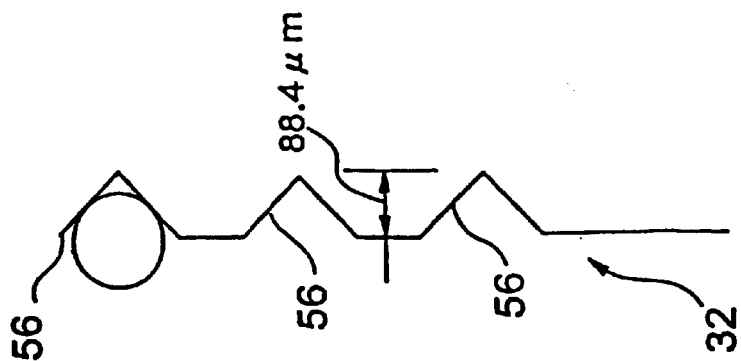
FIG. 6D is an enlarged view of a V-groove trench formation portion which is formed in the fixed component forming substrate shown in FIG. 3A.
Figure 6C:
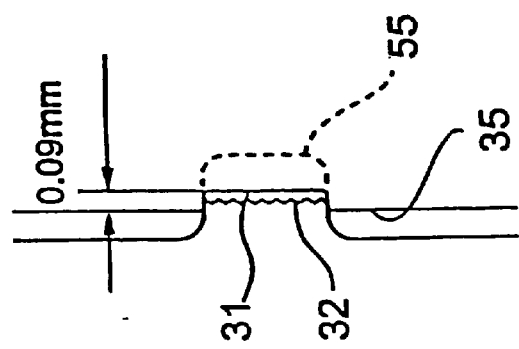
FIG. 6C is a cross sectional view taken on line C—C of the fixed component forming substrate shown in FIG. 3A.
Figure 6B:
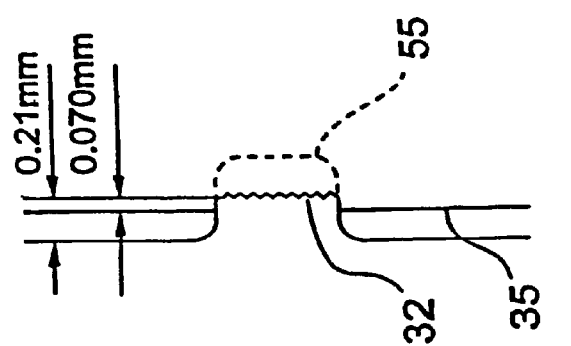
FIG. 6B is a cross sectional view taken on line B—B of the fixed component forming substrate shown in FIG. 3A.
Figure 6A:
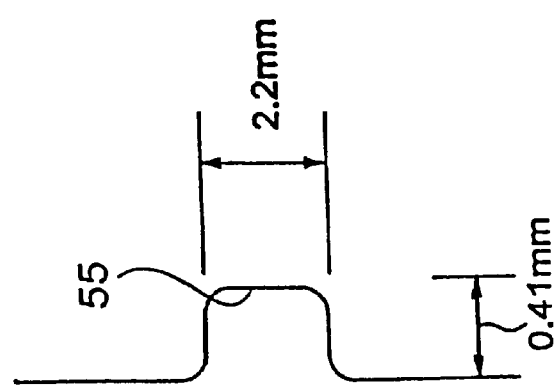
FIG. 6A is a cross sectional view taken on line A—A of the fixed component forming substrate shown in FIG. 3A.

In the above-mentioned insertion recess portion 30, a covering portion insertion portion 55, a V-groove formation portion 32, a flat bottom portion 31, a V-groove formation portion 32, a flat bottom portion 31, a V-groove formation portion 32 and a covering portion insertion portion 55 are formed in this order from the left end side to the right end side of FIG. 3A. The V-groove formation portions 32 and the flat bottom portions 31 are formed in the recess portion 35. In addition, as shown in FIG. 6A to FIG. 6C, the parts are deeply formed so as to fulfill the relationship of the depth of the covering portion insertion portion 55>the depth of the flat bottom portion 31>the depth of the V-groove formation portion 32. In the V-groove formation portion 32, as shown in FIG. 6D, a plurality of V-grooves 56 are formed at intervals.

Now, the V-grooves 56 are formed in each of the V-groove formation portions 32 by the number corresponding to the number of optical fibers which are arranged in parallel with one another in the optical fiber ribbon 7 which is inserted into each of the insertion recess portions 30. In this embodiment, as described above, since the number of optical fibers constituting the optical fiber ribbon 7 is eight, the number of V-grooves 56 which are formed in each of the above-mentioned V-groove formation portion 32 is correspondingly eight. In this connection, since the optical fiber 7a which is provided in the metallic substrate 26 of the fixed component 25 has only one optical fiber, the number of V-grooves 56 provided in each of the V-groove formation portions 32 of the metallic substrate 26 is correspondingly one.

After having prepared the metallic substrate 26 having the above-mentioned structure, as shown in FIG. 3C, a solder chip 33, made of Au/Sn, in which an Au layer and an Sn layer are laminated is provided on the bottom of each of the flat bottom portions 31. In this connection, in the case where the solder chips 33 are provided in such a manner, if the flat bottom portions 31 are formed in the insertion recess portion 30, then the solder chips 33 are easy to be arranged.

Under this state, the optical fiber ribbon 7 (refer to FIG. 2B) in each of which the above-mentioned metal coated optical fibers 50 are formed, as shown in FIG. 3D, are inserted along the longitudinal direction of the insertion recess portions 30, respectively. On this occasion, there is obtained the state in which at least the metal coated optical fibers 50 of the middle portion of the optical fiber ribbon 7 are inserted into the insertion recess portion 30 including the formation area of the recess portion 35. In this embodiment, the metal coated optical fibers 50 of the coating removed portion, and the end portions of the coating 51, on both the sides, between which the metal coated optical fibers 50 are located are both inserted into the insertion recess portion 30.

Next, as shown in FIG. 4A, a solder chip 34 having the same material as that of each of the solder chips 33 is arranged on the surface side of the metal coated optical fibers 50. Then, as shown in FIG. 4B and FIG. 4C (a side elevational view of FIG. 4B), an optical fiber fixing plate 27 as an optical fiber fixing member made of metal is provided on the surface side of the solder chip 34. As a result, the metal coated optical fibers 50 are sandwiched between the optical fiber fixing plate 27 and the metallic substrate 26. In this connection, in this embodiment, the width of the solder chip 34 is slightly smaller than that of the recess portion 35, and the optical fiber fixing plate 27 is provided so as to be fitted in the recess portion 35.

Under this state, the temperature is made rise such that the solder chips 33 and 34 are melted. Thus, the metal coated optical fibers 50 are tightly fixed to both of the metallic substrate 26 and the optical fiber fixing plate 27 by the solder chips 33 and 34.

In addition, as shown in FIG. 5A, FIG. 5B and FIG. 5C, ribbon getting off preventing plates 28 are arranged on the surface side of the covering portions 51 of the optical fiber ribbon 7. Then, the getting off preventing plates 28 for the optical fiber ribbon 7 are fixed by getting off preventing plate fixing screws 53. In addition, an adhesive 54 is provided on both the end sides of each of the ribbon getting off preventing plates 28, and the ribbon getting off preventing plates 28, the optical fiber fixing plate 27, and the optical fiber ribbon 7 which is inserted into the covering portion insertion portions 55 are fixed to the metallic substrate 26 by the adhesive 54.

The fixed component 24 is manufactured in a manner as described above. The fixed component 25, in roughly the same manner as that described above, is also manufactured by fixing one optical fiber 7a to the metallic substrate 26.

In such a manner, by applying the above-mentioned manufacturing method, the fixed components 24 and 25 each of which has the construction inherent in the present invention can be manufactured.

When manufacturing the optical component of this embodiment, as shown in FIG. 1A and FIG. 1B, the fixed components 24 and 25 each having the above-mentioned construction are inserted and fitted into the respective through holes 29 of the body 1 so that one end side of the optical fiber ribbon 7 and the optical fiber 7a which are respectively fixed to the fixed components 24 and 25 is inserted into the component accommodating portion 4 of the body 1.

Figure 9:
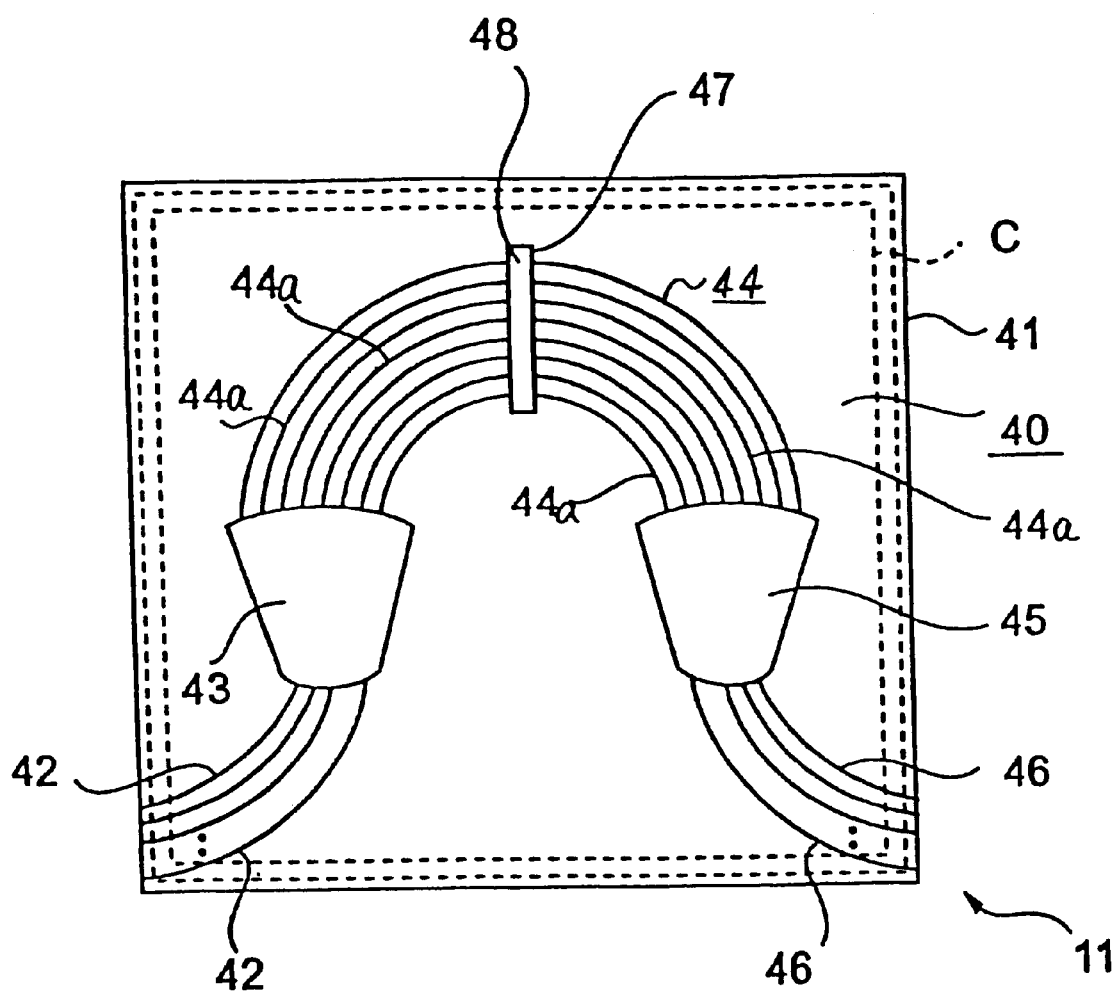
FIG. 9 is a top plan view useful in explaining an example of an arrayed waveguide grating type optical multiplexer/demultiplexer which is formed by providing a half waveplate.

Then, one end side of the optical fiber ribbon 7 which is fixed to the associated one of the fixed components 24 is connected to the output end of the optical output waveguides 46 (refer to FIG. 9) of the AWG type optical multiplexer/demultiplexer 11. In addition, one end of the optical fiber 7a which is fixed to the fixed component 25 is connected to the input end of one of at least optical input waveguide 42 (refer to FIG. 9) of the AWG type optical multiplexer/demultiplexer 11. On the other hand, the other end side of the optical fiber ribbon 7 and the optical fiber 7a which are respectively fixed to the fixed components 24 and 25 is extracted to the outside of the metallic case.

Then, in this embodiment, the outer peripheries of the fixed components 24 and 25, and the inner walls of the respective through holes 29 are fixed to each other by solder. That is, the joining portions between the through holes 29, and the fixed components 24 and 25 (the all-around of the outer periphery sides of the fixed components 24 and 25, and the all-around of the inner wall sides of the through holes 29) are sealed with solder. In this connection, in order to improve the mechanical strength of the fixed components 24 and 25 which are inserted and fitted into the respective through holes 29, after only each of YAG welding fixed portions 58 shown in FIG. 1B for example has been Nd—YAG-welded and fixed, the fixed components 24 and 25 are fixed by solder for sealing.

In such a manner, by carrying out the sealing by solder, the fixed components 24 and 25 are hermetically fixed to the body 1, and as described above, the fixed components 24 and 25 are hermetically fixed to the metallic case.

In this connection, when fixing the fixed components 24 and 25, the hermetic fixing of the conductors 18 and 19 of the Peltier module 6 and the thermistor 23 as described above is carried out as follows. That is, first of all, hermetic terminals 39 are inserted into respective conductor insertion holes 60 of the body 1 to be disposed therein and then are fixed to the body 1 by the welding using electrode pin sealing glass or the like. Thereafter, the fixed components 24 and 25 are fixed to the body 1 and then the conductors 18 and 19 are fixed to the electrode pins of the hermetic terminals 39 by melting solder to carry out the wiring. Thus, the conductors 18 and 19 are both hermetically fixed thereto. Thereafter, as shown in FIG. 7A, the lid 2 is provided on the upper face side of the body 1 and the all-around of the joining portion of the body 1 and the lid 2 is seam-welded to fix hermetically the body 1 and the lid 2 to each other.

This embodiment is constructed in a manner as described above. In such a manner, in this embodiment, the characteristic fixed components 24 and 25 each of which is manufactured by the above-mentioned manufacturing method are fitted into the respective through holes 29 which are formed in the body 1 made of metal to fix hermetically the fixed components 24 and 25 to the metallic case including the body 1 and the lid 2. For this reason, the permeation of the moisture into the metallic case can be roughly perfectly prevented.

In addition, according to this embodiment, one end side of the optical fiber ribbon 7 and the optical fiber 7a which are fixed to the fixed components 24 and 25, respectively, is connected to the AWG type optical multiplexer/demultiplexer 11 which is accommodated in the component accommodating portion 4 of the metallic case. On the other hand, the other end side of the optical fiber ribbon 7 and the optical fiber 7a is extracted to the outside of the metallic case. As a result, the AWG type optical multiplexer/demultiplexer 11 can be optically connected to the optical component as the other party side of the connection through the optical fiber ribbon 7 and the optical fiber 7a the other end side of which is extracted to the outside of the metallic case.

In addition, in this embodiment, the AWG type optical multiplexer/demultiplexer 11 which is accommodated in the metallic case is the AWG type optical multiplexer/demultiplexer 11 which has been proposed (the AWG type optical multiplexer/demultiplexer which is capable of suppressing the polarization dependency of the central wavelength without providing the half waveplate 48). Therefore, the problems which arise due to the provision of the half waveplate 48 in the AWG type optical multiplexer/demultiplexer 11 (the problem of occurrence of the return loss, the problem of the cost-up, and the like) can be avoided. In addition thereto, by including the above-mentioned construction inherent in this embodiment, exerting the bad influence due to the high temperature and the high humidity on the AWG type optical multiplexer/demultiplexer 11 can be suppressed. The above-mentioned AWG type optical multiplexer/demultiplexer 11 which has been proposed is adopted and also the problem due to the high temperature and the high humidity can be avoided, whereby if the optical component of this embodiment is applied to the wavelength division multiplexing communication systems, then it is possible to construct the wavelength division multiplexing communication systems with low cost and high quality.

In this connection, it is to be understood that the present invention is not limited to the above-mentioned embodiment, but various forms will be adopted by those skilled in the art. For example, while in the above-mentioned embodiment, in the insertion recess portion 30 which is formed in each of the fixed components 24 and 25, the covering portion insertion portion 55, the V-groove formation portion 32, the flat bottom portion 31, the V-groove formation portion 32, the flat bottom portion 31, the V-groove formation portion 32 and the covering portion insertion portion 55 are formed in this order, the detailed structure of the insertion recess portion 30 is not particularly limited, but is suitably set.

For example, as shown in FIG. 8A and FIG. 8B (a side elevational view of FIG. 8A), the insertion recess portion 30 may have the structure in which each of the V-groove formation portions 32 is omitted, and only the covering portion insertion portions 55 and the flat bottoms 31 are formed therein. Even when the insertion recess portion 30 is formed in such a manner, the effects which are roughly the same as those of the above-mentioned embodiment can be offered.

In this connection, if the V-groove formation portions 32 are provided as in the above-mentioned embodiment, then the optical fibers which are arranged in parallel with one another in each of the optical fiber ribbon 7 can be more reliably arranged and disposed in the insertion recess portion 30.

In addition, in the above-mentioned embodiment, when forming the fixed components 24 and 25, the optical fiber ribbon 7 and the optical fiber 7a are inserted into the respective insertion recess portions 30 with the solder chips 33 provided in the flat bottom portions 31 of the insertion recess portions 30 of the metallic substrate 26. Thereafter, the solder chips 34 are provided on the surface sides of the optical fiber ribbon 7 and the optical fiber 7a. Thus, solder is provided on the outer periphery side of the metal coated optical fibers 50. However, instead of providing the solder chips 33 and 34, solder having the fluidity such as Sn/Ni or Sn/Pb may be caused to lead thereinto to provide solder on the outer periphery side of the metal coated optical fibers 50. In this connection, in such a case, the above-mentioned insertion recess portion 30 may have the structure in which each of the flat bottom portions 31 is omitted and only the V-groove formation portions 32 and the covering portion insertion portions 55 are formed therein.

In addition thereto, while in the above-mentioned embodiment, as shown in FIG. 4A, each of the solder chips 34 which are provided in the fixed components 24 and 25 is made the chip having the width narrower than that of each of the recess portions 35, as shown in FIG. 8C, the width of the solder chip 34 may be made the width roughly the same as that of the recess portion 35.

Furthermore, while in the above-mentioned embodiment, for the fixed components 24 and 25, the optical fiber fixing plate 27 is provided as the optical fiber fixing member for fixing the metal coated optical fibers 50 on the surface side of the metal coated optical fibers 50, in the case where for example, one optical fiber 7a is fixed as in the fixed component 25, the rod-like optical fiber fixing member may be provided instead of the optical fiber fixing plate 27.

But, in the case where the plate-like optical fiber fixing plate 27 is employed as in the above-mentioned embodiment, the shape of each of the through holes 29 which are formed on the metallic case side, or the like (i.e., the hole portions into which the fixed components are fitted) can be made a simple shape such as a square shape. For this reason, the fixed components 24 and 25 can be made easy to be hermetically fixed to the through holes 29.

In addition, while in the above-mentioned embodiment, each of the fixed components 24 and 25 is formed such that the optical fiber fixing plate 27 is provided on the surface side of the metal coated optical fibers 50, and then the metal coated optical fibers 50 are sandwiched between the optical fiber fixing plate 27 and the metallic substrate 26, the optical fiber fixing plate 27 may be omitted.

Further, while in the above-mentioned embodiment, each of the fixed components 24 and 25 is constructed such that the getting off preventing plates 28 for fixing the covering portions 51 of each of the optical fiber ribbon 7 and the optical fiber 7a to the metallic substrate 26 are provided, the getting off preventing plates 28 for the optical fiber ribbon and the optical fiber may be omitted. But, if those getting off preventing plates 28 are provided, the optical fiber ribbon 7 and the optical fiber 7a can be more tightly fixed to the metallic substrate 26.

Furthermore, while in the above-mentioned embodiment, the metal coated optical fibers 50 and the end portions of the cover portions 51 on both the sides of the metal coated optical fibers 50 sandwiched therebetween are inserted and fixed to the insertion recess portion 30, at least the metal coated optical fibers 50 may be inserted and fixed to the insertion recess portion 30. However, if the end portions of the cover portions 51 are inserted and fixed together with the metal coated optical fibers 50 thereto as in the above-mentioned embodiment, then each of the optical fiber ribbon 7 and the optical fiber 7a can be more firmly fixed to the metallic substrate 26 and also the strength of the fixing portions for each of the optical fiber ribbon 7 and the optical fiber 7a, which are fixed to the metallic substrate 26, can also be increased.

In addition, while the above-mentioned embodiment, when fixing the fixed components 24 and 25 to the respective through holes 29 of the body 1, they are hermetically fixed thereto by solder, instead of the seal fixing by solder, for example, the method such as the electron beam welding may be utilized as long as each of the fixed components 24 and 25 is hermetically sealed and fixed to the metallic case.

Also, while in the above-mentioned embodiment, when fixing the lid 2 to the body 1, the fixing is carried out by utilizing the seam welding, instead of the seam welding, the suitable joining method such as the electron beam welding may be utilized as long as the lid 2 made of metal is hermetically fixed to the body 1 made of metal.

Further, while in the above-mentioned embodiment, the optical fiber ribbon 7 having the eight optical fibers is fixed to each of the fixed components 24, and the optical fiber 7a having one optical fiber is fixed to the fixed component 25, it is to be understood that the number of optical fibers provided in each of the optical fiber ribbon 7 which are fixed to the respective fixed components 24 is not particularly limited thereto, and hence it is suitably set. In addition, while the pitch of the optical fibers which are arranged in parallel with one another in each of the optical fiber ribbon 7 is generally set to 250 $\mu$m as in the above-mentioned embodiment, it is to be understood that the pitch of the optical fibers arranged in parallel with one another is not also particularly limited thereto, and hence it is suitably set.

In addition, while in the above-mentioned embodiment, for the optical components, the through holes 29 are formed in the body 1 constituting the metallic case, and the fixed components 24 and 25 are inserted and fitted into the respective through holes 29 to be fixed thereto, instead of providing the through holes 29, the construction may be adopted such that through recess portions through which the outside of the metallic case and the component accommodating portion 4 communicate with each other are provided, and the fixed components 24 and 25 are inserted and fitted into the respective through recess portions to be fixed thereto.

Also, while in the above-mentioned embodiment, the AWG type optical multiplexer/demultiplexer 11 as the example which has been proposed is accommodated in the component accommodating portion 4 of the metallic body 1 to form the optical component, it is to be understood that in the optical component of the present invention, the component(s) accommodated in the component accommodating portion 4 of the metallic case is/are not particularly limited thereto, and it/they is/are suitably set. For example, an AWG type optical multiplexer/demultiplexer which is different in construction from the AWG type optical multiplexer/demultiplexer 11 may be accommodated in the component accommodating portion 4 or other suitable component other than the AWG type optical multiplexer/demultiplexer may be accommodated in the component accommodating portion 4.

In the present invention, since the permeation of the moisture into the metallic case can be suppressed, the component(s) accommodated in the component accommodating portion 4 is/are suitably set, whereby exerting the influence of the moisture on the component(s) accommodated therein can be effectively suppressed, and hence it is possible to realize the construction of various optical communication systems of high quality.

Furthermore, while in the above-mentioned embodiment, the metallic case constituting the optical component is constructed so as to have the body 1 and the lid 2 as shown in FIG. 7B, it is to be understood that the construction of the metallic case is not particularly limited thereto, and hence is suitably set.

While the present invention has been particularly shown and described with reference to the embodiments and the specified modifications thereof, it will be understood that the various changes and other modifications will occur to those skilled in the art without departing from the scope and true spirit of the invention. The scope of the invention is therefore to be determined solely by the appended claims.

What is claimed is:

1. An optical component, comprising
a fixed component comprising a metallic substrate in which at least one of an insertion portion of an optical fiber(s) and an insertion portion of an optical fiber ribbon is formed on a surface side thereof, a coating removed portion which is formed in the middle portion of the optical fiber(s) or the optical fiber ribbon and which is inserted into said insertion portion along the longitudinal direction, a coating metal material with which the outer periphery surfaces of the bared optical fiber of said coating removed portion are covered to form metal coated optical fibers, and a solder which is provided on the outer periphery sides of said metal coated optical fibers to fix said metal coated optical fibers to said metallic substrate;
a case made of metal including a component accommodating portion; and
a through portion provided in said metallic case such that the outside of said metallic case and said component accommodating portion communicate with each other, said fixed component being fitted into said through portion;
wherein an optical fiber fixing member made of metal is provided on the surface side of said metal coated optical fibers such that said metal coated optical fibers are sandwiched between said optical fiber fixing member and said metallic substrate and said metal coated optical fibers are fixed to said optical fiber fixing member by solder which is provided on the outer periphery side of said metal coated optical fibers.

2. The optical component according to claim 1, wherein an optical fiber(s) or an optical fiber ribbon is/are fixed to said fixed component such that one end side thereof is inserted into said component accommodating portion and the other end thereof is extracted to the outside of said metallic case.

3. The optical component according to claim 2, wherein said fixed component is hermetically sealed and fixed to said metallic case.

4. The optical component according to claim 1, wherein said fixed component is hermetically sealed and fixed to said metallic case.

5. The optical component according to claim 1, further comprising
an arrayed waveguide grating type optical multiplexer/demultiplexer having the waveguide construction wherein a first slab waveguide is connected to the output end of one or more optical input waveguides arranged side by side;
an arrayed waveguide including a plurality of channel waveguides arranged side by side, which have the lengths different between adjacent channel waveguides by a preset difference and which serve to propagate therethrough the light guided from said first slab waveguide, is connected to the output end of said first slab waveguide;
a second slab waveguide is connected to the output end of said arrayed waveguide; and
a plurality of optical output waveguides arranged side by side are connected to the output end of said second slab waveguide, is accommodated in a component accommodating portion.

6. The optical component according to claim 5, wherein a plurality of through portions are formed in a case made of metal.

7. The optical component according to claim 6, wherein fixed components are fitted and fixed to said through holes, respectively.

8. The optical component according to claim 7, wherein one end side of an optical fiber(s) or an optical fiber ribbon which is/are fixed to the respective fixed components is connected to one of at least one of said optical input waveguides and said optical output waveguides of said arrayed waveguide grating type optical multiplexer/demultiplexer.

9. The optical component according to claim 1, wherein an arrayed waveguide grating type optical multiplexer/demultiplexer in which the waveguide construction wherein
a first slab waveguide is connected to the output end of one or more optical input waveguides arranged side by side;
an arrayed waveguide including a plurality of channel waveguides arranged side by side, which have the lengths different between adjacent channel waveguides by a preset difference and which serve to propagate therethrough the light guided from said first slab waveguide, is connected to the output end of said first slab waveguide;
a second slab waveguide is connected to the output end of said arrayed waveguide; and
a plurality of optical output waveguides arranged side by side are connected to the output end of said second slab waveguide, is formed by a core made of quartz based glass.

10. The optical component according to claim 9, further comprising a waveguide formation portion including said core, and a over cladding and a under cladding each formed of quartz based glass.

11. The optical component according to claim 10, wherein a birefringence B generated in said waveguide formation portion is set so as to fulfill the relationship of $|B| \leq 5.34 \times 10^{-5}$.

12. The optical component according to claim 11, wherein a plurality of through portions are formed in a case made of metal.

13. The optical component according to claim 12, wherein fixed components are fitted and fixed to said through portions, respectively.

14. The optical component according to claim 13, wherein one end side of an optical fiber(s) or an optical fiber ribbon which is/are fixed to the respective fixed components is connected to one of at least one of said optical input waveguide and said optical output waveguides of said arrayed waveguide grating type optical multiplexer/demultiplexer.

15. An optical component comprising:
a fixed component comprising a metallic substrate in which at least one of an insertion portion of an optical fiber(s) and an insertion portion of an optical fiber ribbon is formed on a surface side thereof, a coating removed portion which is formed in the middle portion of the optical fiber(s) or the optical fiber ribbon and which is inserted into said insertion portion along the longitudinal direction, a coating metal material with which the outer periphery surfaces of the bared optical fiber of said coating removed portion are covered to form metal coated optical fibers, and solder which is provided on the outer periphery sides of said metal coated optical fibers to fix said metal coated optical fibers to said metallic substrate;
a case made of metal including a component accommodating portion; and
a through portion provided in said metallic case such that the outside of said metallic case and said component accommodating portion communicate with each other, said fixed component being fitted into said through portion;
an arrayed waveguide grating type optical multiplexer/demultiplexer having a waveguide construction wherein
a first slab waveguide is connected to the output end of one or more optical input waveguides arranged side by side;
an arrayed waveguide including a plurality of channel waveguides arranged side by side, which have the lengths different between adjacent channel waveguides by a preset difference and which serve to propagate therethrough the light guided from said first slab waveguide, is connected to the output end of said first slab waveguide;
a second slab waveguide is connected to the output end of said arrayed waveguide; and
a plurality of optical output waveguides arranged side by side are connected to the output end of said second slab waveguide, is accommodated in a component accommodating portion.

16. The optical component according to claim 15, further comprising a plurality of through portions formed in a case made of metal.

17. The optical component according to claim 16, wherein fixed components are fitted and fixed to said through holes, respectively.

18. The optical component according to claim 17, wherein one end side of an optical fiber(s) or an optical fiber ribbon which is/are fixed to the respective fixed components is connected to one of at least one of said optical input waveguide and said optical output waveguides of said arrayed waveguide grating type optical multiplexer/demultiplexer.

19. An optical component comprising:
a fixed component comprising a metallic substrate in which at least one of an insertion portion of an optical fiber(s) and an insertion portion of an optical fiber ribbon is formed on a surface side thereof, a coating removed portion which is formed in the middle portion of the optical fiber(s) or the optical fiber ribbon and which is inserted into said insertion portion along the longitudinal direction, a coating metal material with which the outer periphery surfaces of the bared optical fiber of said coating removed portion are covered to form metal coated optical fibers, and solder which is provided on the outer periphery sides of said metal coated optical fibers to fix said metal coated optical fibers to said metallic substrate;
a case made of metal including a component accommodating portion; and
a through portion provided in said metallic case such that the outside of said metallic case and said component accommodating portion communicate with each other, said fixed component being fitted into said through portion;
wherein an arrayed waveguide grating type optical multiplexer/demultiplexer in which the waveguide construction wherein
a first slab waveguide is connected to the output end of one or more optical input waveguides arranged side by side;
an arrayed waveguide including a plurality of channel waveguides arranged side by side, which have the lengths different between adjacent channel waveguides by a preset difference and which serve to propagate therethrough the light guided from said first slab waveguide, is connected to the output end of said first slab waveguide;
a second slab waveguide is connected to the output end of said arrayed waveguide; and
a plurality of optical output waveguides arranged side by side are connected to the output end of said second slab waveguide, is formed by a core made of quartz based glass.

20. The optical component according to claim 19, further comprising a waveguide formation portion including said core, and a over cladding and a under cladding each formed of quartz based glass.

21. The optical component according to claim 20, wherein a birefringence B generated in said waveguide formation portion is set so as to fulfill the relationship of $|B| \leq 5.34 \times 10^{-5}$.

22. The optical component according to claim 21, wherein a plurality of through portions are formed in a case made of metal.

23. The optical component according to claim 22, wherein fixed components are fitted and fixed to said through holes, respectively.

24. The optical component according to claim 23, wherein one end side of an optical fiber(s) or an optical fiber ribbon which is/are fixed to the respective fixed components is connected to one of at least one of said optical input waveguide and said optical output waveguides of said arrayed waveguide grating type optical multiplexer/demultiplexer.

25. An optical component comprising:

a fixed component comprising a metallic substrate in which at least one of an insertion portion of an optical fiber(s) and an insertion portion of an optical fiber ribbon is formed on a surface side thereof, a coating removed portion which is formed in the middle portion of the optical fiber(s) or the optical fiber ribbon and which is inserted into said insertion portion along the longitudinal direction, a coating metal material with which the outer periphery surfaces of the bared optical fiber of said coating removed portion are covered to form metal coated optical fibers, and solder which is provided on the outer periphery sides of said metal coated optical fibers to fix said metal coated optical fibers to said metallic substrate;

a case made of metal including a component accommodating portion;

a through portion provided in said metallic case such that the outside of said metallic case and said component accommodating portion communicate with each other, said fixed component being fitted into said through portion; and an optical fiber(s) or an optical fiber ribbon which is/are fixed to said fixed component such that one end side thereof is inserted into said component accommodating portion and the other end thereof is extracted to the outside of said metallic case;

wherein an optical fiber fixing member made of metal is provided on the surface side of said metal coated optical fibers such that said metal coated optical fibers are sandwiched between said optical fiber fixing member and said metallic substrate, said metal coated optical fibers are fixed to said optical fiber fixing member by solder which is provided on the outer periphery side of said metal coated optical fibers and said fixed component is hermetically sealed and fixed to said metallic case.

26. An optical component employing a fixed component as defined in claim 25, wherein an arrayed waveguide grating type optical multiplexer/demultiplexer having the waveguide construction wherein a first slab waveguide is connected to the output end of one or more optical input waveguides arranged side by side;

an arrayed waveguide including a plurality of channel waveguides arranged side by side, which have the lengths different between adjacent channel waveguides by a preset difference and which serve to propagate therethrough the light guided from said first slab waveguide, is connected to the output end of said first slab waveguide;

a second slab waveguide is connected to the output end of said arrayed waveguide; and a plurality of optical output waveguides arranged side by side are connected to the output end of said second slab waveguide, is accommodated in a component accommodating portion, a plurality of through portions are formed in a case made of metal, fixed components are fitted and fixed to said through holes, respectively, and one end side of an optical fiber(s) or an optical fiber ribbon which is/are fixed to the respective fixed components is connected to one of at least one of said optical input waveguides and said optical output waveguides of said arrayed waveguide grating type optical multiplexer/demultiplexer.

27. An optical component employing a fixed component as defined in claim 25, wherein an arrayed waveguide grating type optical multiplexer/demultiplexer in which the waveguide construction wherein a first slab waveguide is connected to the output end of one or more optical input waveguides arranged side by side;

an arrayed waveguide including a plurality of channel waveguides arranged side by side, which have the lengths different between adjacent channel waveguides by a preset difference and which serve to propagate therethrough the light guided from said first slab waveguide, is connected to the output end of said first slab waveguide;

a second slab waveguide is connected to the output end of said arrayed waveguide; and a plurality of optical output waveguides arranged side by side are connected to the output end of said second slab waveguide, is formed by a core made of quartz based glass, which has a waveguide formation portion including said core, and a over cladding and a under cladding each formed of quartz based glass, and in which the birefringence B generated in said waveguide formation portion is set so as to fulfill the relationship of $|B| \leq 5.34 \times 10^{-5}$, a plurality of through portions are formed in a case made of metal, fixed components are fitted and fixed to said through portions, respectively, and one end side of an optical fiber(s) or an optical fiber ribbon which is/are fixed to the respective fixed components is connected to one of at least one of said optical input waveguides and said optical output waveguides of said arrayed waveguide grating type optical multiplexer/demultiplexer.

28. An optical component comprising:

a fixed component comprising a metallic substrate in which at least one of an insertion portion of an optical fiber(s) and an insertion portion of an optical fiber ribbon is formed on a surface side thereof, a coating removed portion which is formed in the middle portion of the optical fiber(s) or the optical fiber ribbon and which is inserted into said insertion portion along the longitudinal direction, a coating metal material with which the outer periphery surfaces of the bared optical fiber of said coating removed portion are covered to form metal coated optical fibers, and solder which is provided on the outer periphery sides of said metal coated optical fibers to fix said metal coated optical fibers to said metallic substrate;

a case made of metal including a component accommodating portion;

a through portion provided in said metallic case such that the outside of said metallic case and said component accommodating portion communicate with each other, said fixed component being fitted into said through portion; and an optical fiber(s) or an optical fiber ribbon which is/are fixed to said fixed component such that one end side thereof is inserted into said component accommodating portion and the other end thereof is extracted to the outside of said metallic case, wherein said fixed component is hermetically sealed and fixed to said metallic case;

an arrayed waveguide grating type optical multiplexer/demultiplexer having the waveguide construction wherein a first slab waveguide is connected to the output end of one or more optical input waveguides arranged side by side; an arrayed waveguide including a plurality of channel waveguides arranged side by side, which have the lengths different between adjacent channel waveguides by a preset difference and which serve to propagate therethrough the light guided from said first slab waveguide, is connected to the output end of said first slab waveguide;

a second slab waveguide is connected to the output end of said arrayed waveguide;

and a plurality of optical output waveguides arranged side by side are connected to the output end of said second slab waveguide, is accommodated in a component accommodating portion;

a plurality of through portions are formed in a case made of metal;

fixed components are fitted and fixed to said through holes; respectively, and one end side of an optical fiber(s) or an optical fiber ribbon which is/are fixed to the respective fixed components is connected to one of at least one of said optical input waveguide and said optical output waveguides of said arrayed waveguide grating type optical multiplexer/demultiplexer.

29. An optical component comprising:

a fixed component comprising a metallic substrate in which at least one of an insertion portion of an optical fiber(s) and an insertion portion of an optical fiber ribbon is formed on a surface side thereof, a coating removed portion which is formed in the middle portion of the optical fiber(s) or the optical fiber ribbon and which is inserted into said insertion portion along the longitudinal direction, a coating metal material with which the outer periphery surfaces of the bared optical fiber of said coating removed portion are covered to form metal coated optical fibers, and solder which is provided on the outer periphery sides of said metal coated optical fibers to fix said metal coated optical fibers to said metallic substrate;

a case made of metal including a component accommodating portion;

a through portion provided in said metallic case such that the outside of said metallic case and said component accommodating portion communicate with each other, said fixed component being fitted into said through portion; and an optical fiber(s) or an optical fiber ribbon which is/are fixed to said fixed component such that one end side thereof is inserted into said component accommodating portion and the other end thereof is extracted to the outside of said metallic case, wherein said fixed component is hermetically sealed and fixed to said metallic case;

an arrayed waveguide grating type optical multiplexer/demultiplexer in which the waveguide construction wherein a first slab waveguide is connected to the output end of one or more optical input waveguides arranged side by side;

an arrayed waveguide including a plurality of channel waveguides arranged side by side, which have the lengths different between adjacent channel waveguides by a preset difference and which serve to propagate therethrough the light guided from said first slab waveguide, is connected to the output end of said first slab waveguide;

a second slab waveguide is connected to the output end of said arrayed waveguide; and a plurality of optical output waveguides arranged side by side are connected to the output end of said second slab waveguide, is formed by a core made of quartz based glass, which has a waveguide formation portion including said core, and a over cladding and a under cladding each formed of quartz based glass, and in which the birefringence B generated in said waveguide formation portion is set so as to fulfill the relationship of $|B| \leq 5.34 \times 10^{-5}$;

a plurality of through portions are formed in a case made of metal; and fixed components are fitted and fixed to said through holes, respectively, and one end side of an optical fiber(s) or an optical fiber ribbon which is/are fixed to the respective fixed components is connected to one of at least one of said optical input waveguides and said optical output waveguides of said arrayed waveguide grating type optical multiplexer/demultiplexer.

* * * * *